United States Patent
Comerford et al.

(10) Patent No.: US 7,024,363 B1
(45) Date of Patent: Apr. 4, 2006

(54) METHODS AND APPARATUS FOR CONTINGENT TRANSFER AND EXECUTION OF SPOKEN LANGUAGE INTERFACES

(75) Inventors: Liam David Comerford, Carmel, NY (US); David Carl Frank, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/460,913

(22) Filed: Dec. 14, 1999

(51) Int. Cl.
*G10L 21/00* (2006.01)

(52) U.S. Cl. .................... 704/270; 704/270.1
(58) Field of Classification Search ............... 704/257, 704/270, 271, 277; 379/88.05, 88.06; 707/100, 707/101, 102, 103, 104
See application file for complete search history.

(56) References Cited

U.S. PATENT DOCUMENTS

| | | | |
|---|---|---|---|
| 4,841,387 A | | 6/1989 | Rindfuss |
| 5,199,080 A | | 3/1993 | Kimura et al. |
| 5,243,149 A | | 9/1993 | Comerford et al. |
| 5,335,276 A | | 8/1994 | Thompson et al. |
| 5,355,433 A | * | 10/1994 | Yasuda et al. ............... 704/243 |
| 5,475,798 A | | 12/1995 | Handlos |
| 5,481,616 A | | 1/1996 | Freadman |
| 5,526,411 A | | 6/1996 | Krieter |
| 5,583,964 A | * | 12/1996 | Wang ........................... 706/41 |
| 5,619,684 A | | 4/1997 | Goodwin et al. |
| 5,752,232 A | * | 5/1998 | Basore et al. ............... 704/275 |
| 5,765,157 A | * | 6/1998 | Lindholm et al. ............ 707/101 |
| 5,787,152 A | | 7/1998 | Freadman |
| 5,813,026 A | * | 9/1998 | Borg et al. .................. 711/115 |
| 5,845,282 A | * | 12/1998 | Alley et al. .................... 707/10 |
| 5,946,376 A | * | 8/1999 | Cistulli .................... 379/88.06 |
| 6,035,275 A | * | 3/2000 | Brode et al. ................. 704/275 |
| 6,044,347 A | * | 3/2000 | Abella et al. ............... 704/272 |
| 6,097,806 A | * | 8/2000 | Baker et al. ................ 379/265 |
| 6,144,938 A | * | 11/2000 | Surace et al. ............... 704/257 |
| 6,154,745 A | * | 11/2000 | Kari et al. ................... 707/100 |
| 6,173,266 B1 | * | 1/2001 | Marx et al. ................. 704/270 |
| 6,216,104 B1 | * | 4/2001 | Moshfeghi et al. ......... 704/260 |
| 6,216,158 B1 | * | 4/2001 | Luo et al. .................... 709/217 |
| 6,233,559 B1 | * | 5/2001 | Balakrishnan .............. 704/275 |
| 6,233,561 B1 | * | 5/2001 | Junqua et al. .............. 704/257 |
| 6,282,508 B1 | * | 8/2001 | Kimura et al. ................ 704/10 |
| 6,356,865 B1 | * | 3/2002 | Franz et al. .................... 704/2 |
| 2002/0091513 A1 | * | 7/2002 | Mozer et al. ............... 704/220 |

OTHER PUBLICATIONS

Portable Translator, IBM Technical Disclosure Bulletin; vol. 37; No. 11, pp. 185-188, Nov. 1994.*

Das, S. K et al.; Microprocessor-controlled speech communication link to a time-shared computer; IBM Technical Disclosure Bulletin; vol. 20; No. 11B; pp. 5051-5054; Apr. 1978.*

(Continued)

*Primary Examiner*—Abul K. Azad
(74) *Attorney, Agent, or Firm*—Ryan, Mason & Lewis, LLP

(57) ABSTRACT

A method for managing spoken language interface data structures and collections of user interface service engines in a spoken language dialog manager in a personal speech assistant. Interfaces, designed as part of applications, may by these methods be added to or removed from the set of such interfaces used by a dialog manager. Interface service engines, required by new applications, but not already present in the dialog manager, may be made available to the new and subsequently added applications.

9 Claims, 15 Drawing Sheets

OTHER PUBLICATIONS

U.S. Appl. No. 08/822,852 (Mozer et al.).*

Palm Parrot™, http://www.pilotisland.com/parrot.htm, Pilot Island Publishing, Inc., Winter Garden, FL, 1 page, printed on Mar. 24, 1999.

"PDA's Small Form Factors Make Voice a Good Input Choice, When Possible," Portable Design Editorial, www.portable-design.com/editorial/1999/11/1199_26.html, pp. 1-10, Nov. 1999.

"SAPI Basics," (provided by Microsoft in their developers web page), pp. 1-5.

"Philips Speech Mike, The Revolutionary Trackball, Microphone and Speaker in One Hand-Held Device," p. 1.

"Speech Commander—Verbex Voice Systems," Verbex Voice Systems, http://www.verbex.com/, p. 1.

"PDA's and Speech Recognition," PDA Developers, S. Mann, pp. 1-2, Jul./Aug. 1996.

"Voice It® Mobile Digital Recorder, Digital Voice Solutions for Business Mobility," Universal Disk Inc., Speech Recognition, pp. 1-4.

"Voice Notes: A Speech Interface For A Hand-Held Voice Notetaker," L.J. Stifelman, et al., pp. 1-16.

"World's First Hand-Held Speech Productivity System For PalmPilot™, Microsoft® Outlook®, Lotus® Notes, GoldMine® and Symantec®ACT!™ Introduced By Dragon Systems®," Dragon Systems, Inc. Press Releases, pp. 1-4, Apr. 12, 1999.

"Very Different Drums Sound the Call as Microsoft, 3Com March to War," PDA Today, G. Lewis, pp. 1-2.

"Art, Advanced Recognition Technologies Wins PC Maga Golden Gavel Award," PC Magazine, Editors' Day 1998, B. Hoffmann, pp. 1-2, Jun. 30, 1998.

"Voice Response Translator," Metro Nashville Police Dept., p. 1.

"Introducing CellPhone Commander," Integrated Wave Technologies, Inc., pp. 1-2.

"Development of a Voice-Command, Belt-Mounted Translator for Law Enforcement Use," CellPhone Commander, Special Report, pp. 1-15, Apr. 1998.

"What is StoryHarp?," Kurtz-Fernhout Software, webmaster@kurtz-fernhout.com, p. 1, Mar. 10, 1999.

"StoryHarp Screen Shots," Kurtz-Fernhout Software, webmaster@kurtz-fernhout.com, pp. 1-3, Mar. 10, 1999.

"Essential Definitions," Kurtz-Fernhout Software, webmaster@kurtz-fernhout.com, pp. 1-2, Mar. 10, 1999.

Qualcomm Preliminary Production Sheet, www.qualcomm.com, pp. 1-4, Sep. 1998.

"Welcome to the T Spaces Project Page," IBM Corporation, pp. 1-29.

* cited by examiner

FIG. 7

```
GLOBALLY AVAILABLE ELEMENTS

[dialog_manager]
root.voc
root.pmt
hardware_default.prf

[application_launch]
launch.voc

REGISTERED APPLICATIONS

[address_book]
addVappl.voc
addVappl.pmt
addres.prf

[memo_editor]
memVappl.voc
memVappl.pmt

[date_book]
datVappl.voc
datVappl.pmt
dates.fsg
times.fsg
```

| | |
|---|---|
| mic_type | 1 |
| enable_shutdown | 0 |
| power_time_out | 120000 |
| shut_down_beep | 1 |
| echo_commands | 0 |
| prompt_on_not_recognized | 1 |
| prompt_on_low_spoken_volume | 1 |
| start_up_gender | 0 |
| start_up_volume | 85 |
| start_up_speed | 75 |
| start_up_roughness | 10 |
| start_up_breathiness | 10 |
| start_up_headsize | 40 |
| start_up_pitchfluctuation | 50 |
| start_up_pitchbaseline | 65 |
| start_up_quality | 100 |

FIG. 11A

| | | |
|---|---|---|
| new | nw | null |
| scroll_up | su | 10 |
| scroll_down | sd | 10 |
| top | to | null |
| bottom | bo | null |
| next | nx | null |
| previous | pr | null |
| edit_entry | ed | null |
| done | ok | null |
| repeat | rp | 1 |
| list_all_entries | al | null |
| list_all_names | an | null |
| address_please | ad | null |
| address | ad | null |
| what_is_the_address | ad | null |
| continue | co | null |
| stop_reading | nop | x |
| find_homer_simpson | fi | simpson |
| find_Ed_Smith | fi | smith |
| find_David_Frank | fi | frank |

FIG. 11B

```
typedef struct
{
    char*   command_target;
    char*   spoken_command[CMDMAX];
    char*   command_string[CMDMAX];
    char*   data_string[CMDMAX];
    short   array_length;
} COMMAND_VOCAB;
```

```
empty          the_list_is_empty
nomore         there_are_no_more_items
attop          you_are_at_the_top_of_the_list
emptyaddress   there_is_no_address_for_this_entry
noneselected   no_entry_selected many           there_are_%1_people_named_%2_on_the_list
```

```
typedef struct
{
    char* index_string[PROMPTMAX];
    char* prompt[PROMPTMAX];
    short array_length;
} PROMPT_LIST;
```

FIG. 14A

```
SCRIPT UI FILES ARE INDEX LISTS OF SCRIPTS verify_user      python    {verify}
begin_dictation  python    {dictation}
dial_phone       python    {phone}
greetings        simple    {greet}
problems         inline    say_"Houston,_we_have_a_problem!",Shutdown;
```

FIG. 14B

```
BOOL Verify_user()
{
    engine_manager.mic_button_means(user_verification_engine);
    text_to_speech.say("Please verify your identity by pressing the
                        microphone button and speaking your name.");
    ok = verification_engine.verify_user();
    engine_manager.mic_button_means(command_recognition_engine);
    return(ok);
}
```

FIG. 15

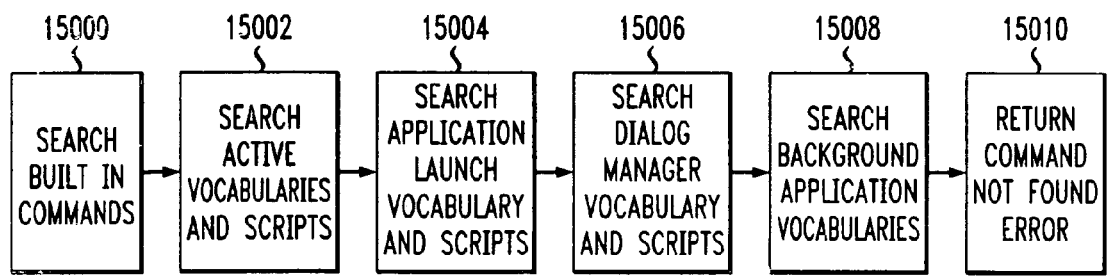

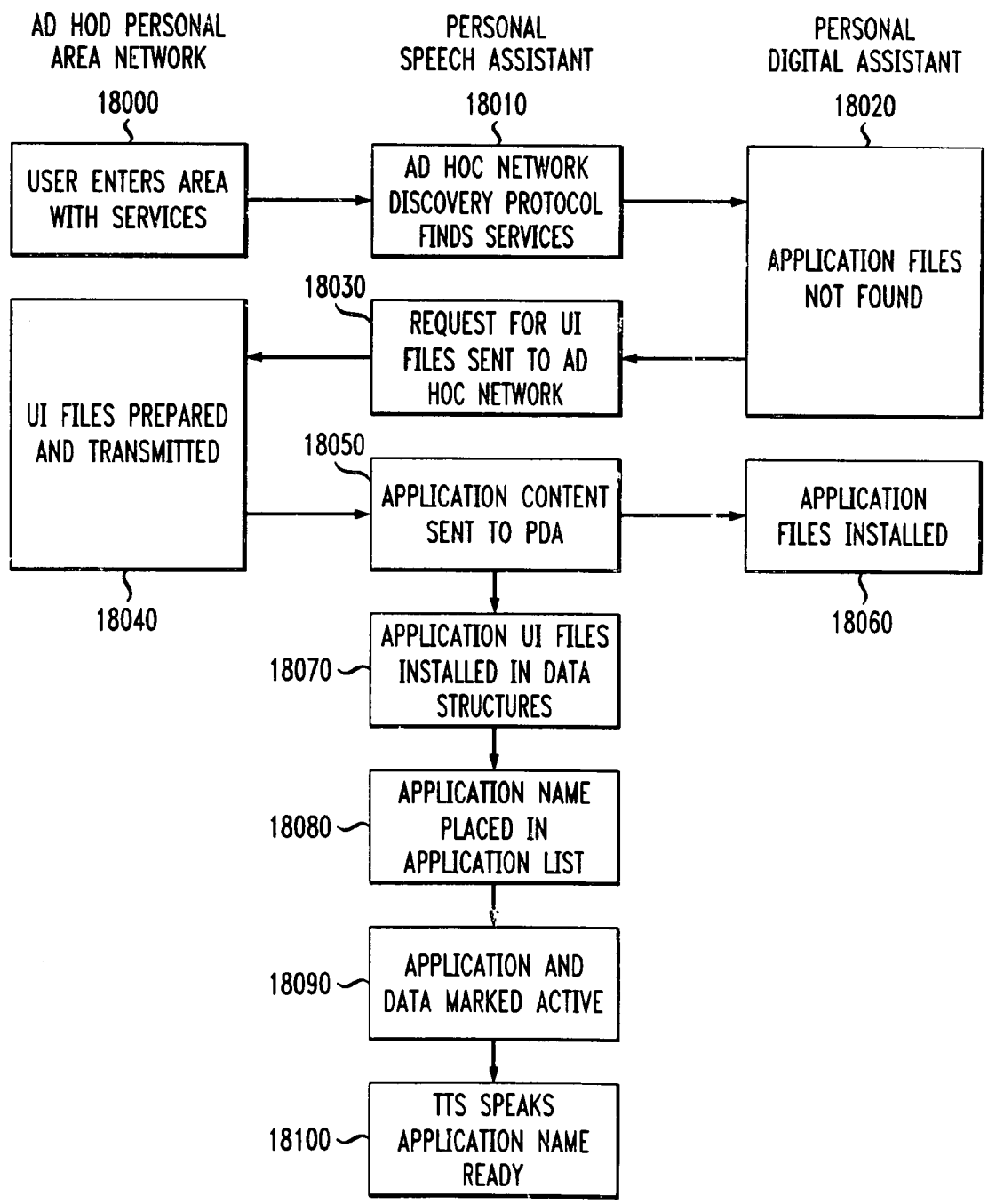

METHODS AND APPARATUS FOR CONTINGENT TRANSFER AND EXECUTION OF SPOKEN LANGUAGE INTERFACES

CROSS REFERENCE TO RELATED APPLICATIONS

The present invention related to U.S. patent applications entitled "Spoken Language User Interface Manager" Ser. No. 09/460,961, "Personal Speech Assistant Supporting a Dialog Manager" Ser. No. 09/460,077, and "Methods and Apparatus for Synchronizing Voice and Text Data in Accordance with Computing Devices" Ser. No. 09/460,921, all filed concurrently herewith and the disclosures of which are incorporated herein by reference.

FIELD OF THE INVENTION

The present invention generally relates to spoken language interfaces employed in association with computing apparatus and, more particularly, to methods and apparatus for contingent transfer and execution of such spoken language interfaces.

BACKGROUND OF THE INVENTION

Spoken language interfaces are most commonly encountered in telephony interfaces. These interfaces are executed on computing systems which are dedicated to a single application such as gathering user data for order taking In order to accomplish this, the user is prompted to utter the required data Limited command decoding is occasionally provided in the form of questions which can be answered with a "yes" or a "no" or a string of numbers. Such an interface is provided for a single application and has no requirement for dynamic change in the content of the commands or prompts since the dedicated task of the application is unchanging. Further, spoken language services are obtained to build the interface by linking an API or application programmers interface.

An interface which engages in a dialog with the user, be it free form or carefully structured and directed, may be created entirely within an executing application or it may be created for the application by a "dialog manager." In general, it is desirable that such a dialog manager support the initiative of either the user or the application. It is, thus, like a communications pipe between the user and the application. Such a dialog manager is described in the above-referenced and concurrently filed U.S. patent application identified by Ser. No. 09/460,077, in the name of L. Cormerford et al., and entitled: "Personal Speech Assistant Supporting a Dialog Manager." It is important to distinguish dialog management, as in the above-referenced patent application, from provision of application programmer interfaces for the "engines" (such as a spoken command decoding engine) providing language related services. APIs, such as Microsoft's Speech Application Programmer's Interface and the JAVA consortium JSAPI interfaces, only provide an abstraction of the "engines" inter in order to allow application programs to operate regardless of the identity of the provider of the particular engines installed on a given user's system. This provides a common low-level interface for accessing the services of engines, but leaves the creation and management of dialog to the individual applications accessing these low level interfaces. It is a pipe between the application and the engine services, not between the user and the application.

Also, given the fact that applications and engines can be dynamic in nature, the conventional APIs provide insufficient means, or no even no means, for updating themselves based on changes in an application or engine. Thus, a need exists for spoken language interface methods and apparatus which address these shortcomings in the existing art.

SUMMARY OF THE INVENTION

The present invention provides methods and apparatus for contingent transfer and execution of spoken language interfaces. In one embodiment, the present invention provides such methodology in the context of a device comprising a Personal Speech Assistant Supporting A Dialog Manager, in accordance with the above-referenced U.S. patent application identified by Ser. No. 09/460,077, and a Personal Digital Assistant (PDA) such that versions of PDA applications are allowed to utilize the dialog management services of the PSA to enrich the user interface.

In a PSA, a spoken language interface is defined in sets of user interface files. These are referred to as vocabularies files, prompt files, profiles and scripts depending on the role they play in structuring the interface. Vocabulary files provide tables relating possible user utterances with events and data that are understood by the target application. Prompt files provide sets of standard responses that may be used by applications to prompt the user to actions or inform the user about application status. Profiles set the parameters for the operation of the PSA hardware such as the voicing parameters used by the text to speech encoding engine or operation of the microphone button as a push to talk button or a push to toggle button. Scripts provide instruction programming sequences of PSA services.

While a PSA may be applied to provide an interface to a static device such as a video cassette recorder (VCR), many applications will have a dynamic structure in which the set of user interface files changes with time. If, for example, the PSA provided a spoken language user interface for a home control system, the user interface would have to add new capabilities if new appliances where added to the household. Similarly, if the PSA were used with a PDA, as new applications where added to the PDA, corresponding user interface data sets, perhaps initially provided as files, would have to be added to the user interface data set collection of the PSA. Further, as technology advances, new human language capabilities or other significant capabilities may need to be added to the collection of "engines" managed by the PSA dialog manager. Also, it is to be appreciated that an application may also request that some user interface files be removed.

Accordingly, it is one purpose of this invention to provide the means by which a spoken language interface such as the user interface data set and the dialog manager engine capabilities of a PSA can be managed based on such contingencies.

In one illustrative wireless contingent transfer and execution embodiment of the invention, a method of automatically providing a spoken language interface for a user with respect to at least one external network with which the user interacts, wherein the user possesses a portable spoken language interface device having a data structure for storing one or more user interface data sets used to provide one or more spoken language interfaces, e.g., a PSA-PDA combination, comprises the steps of: the device requesting a spoken language interface data set from the external network upon discovery of the external network; the external network transferring the spoken language interface data set to the device; and loading the spoken language interface data set into the data structure of the device for use by the user interfacing with the external network.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 7 is an exemplary file registration list for use in accordance with one embodiment of a dialog management system according to the present invention;

FIG. 11A is a exemplary vocabulary data file for use in accordance with one embodiment of a dialog management system according to the present invention;

FIG. 1B is a exemplary vocabulary data structure for use in accordance with one embodiment of a dialog management system according to the present invention;

FIG. 14A is an exemplary script user interface file for use in accordance with one embodiment of a dialog management system according to the present invention;

FIG. 14B is a exemplary script file for use in accordance with one embodiment of a dialog management system according to the present invention;

FIG. 15 is flow diagram illustrating a search order associated with commands in one embodiment of a dialog management system according to the present invention;

FIG. 18A is a block diagram illustrating a wireless implementation of a spoken language interface contingent transfer and execution methodology according to one embodiment of the present invention; and FIG. 18B is a flow diagram illustrating a wireless implementation of a spoken language interface contingent transfer and execution methodology according to one embodiment of the present invention.

DETAILED DESCRIPTION OF PREFERRED EMBODIMENTS

The present invention will be explained below in the context of an illustrative PSA-PDA embodiments, particularly, a PSA-PDA only application and a wireless external network and PSA-PDA application. However, it is to be understood that the present invention is not limited to such a particular applications. Rather, the invention is more generally applicable for use in accordance with computing apparatus which employs a spoken language interface where it is desirable to modify, update and/or add capabilities associated with the spoken language interface in response to application modifications, updates and/or additions.

For ease of reference, the remainder of the detailed description will be divided into sections as follows: (I) Personal Speech Assistant; (II) A Preferred Dialog Management System; and (III) Contingent Transfer and Execution of Spoken Language Interfaces. Accordingly, before describing exemplary preferred embodiments of a spoken language interface contingent transfer and execution methodology, the following two sections, Sections I and II, provide a detailed description of a preferred environment in which such a methodology may be employed. That is, various applicable embodiments of a PSA-PDA combination are described in Section I and various features of a dialog management system used by the PSA are described in Section II. Section III describes various preferred embodiments of the spoken language interface contingent transfer and execution methodology of the invention.

I. Personal Speech Assistant (PSA)

In a first implementation, a PSA provides the onboard processing power required to support execution of software which performs recognition of a set of command words, conversion of ASCII (or other) encoded text into a format which can be made audible (such as pulse code modulated or PCM format), and a dialog manager. In addition, the PSA provides hardware communications means (such as a serial port) consistent with the communication capability of the device for which it provides an interface, microphone output to encoded data conversion, and encoded audio to audible output means.

Figure 1:
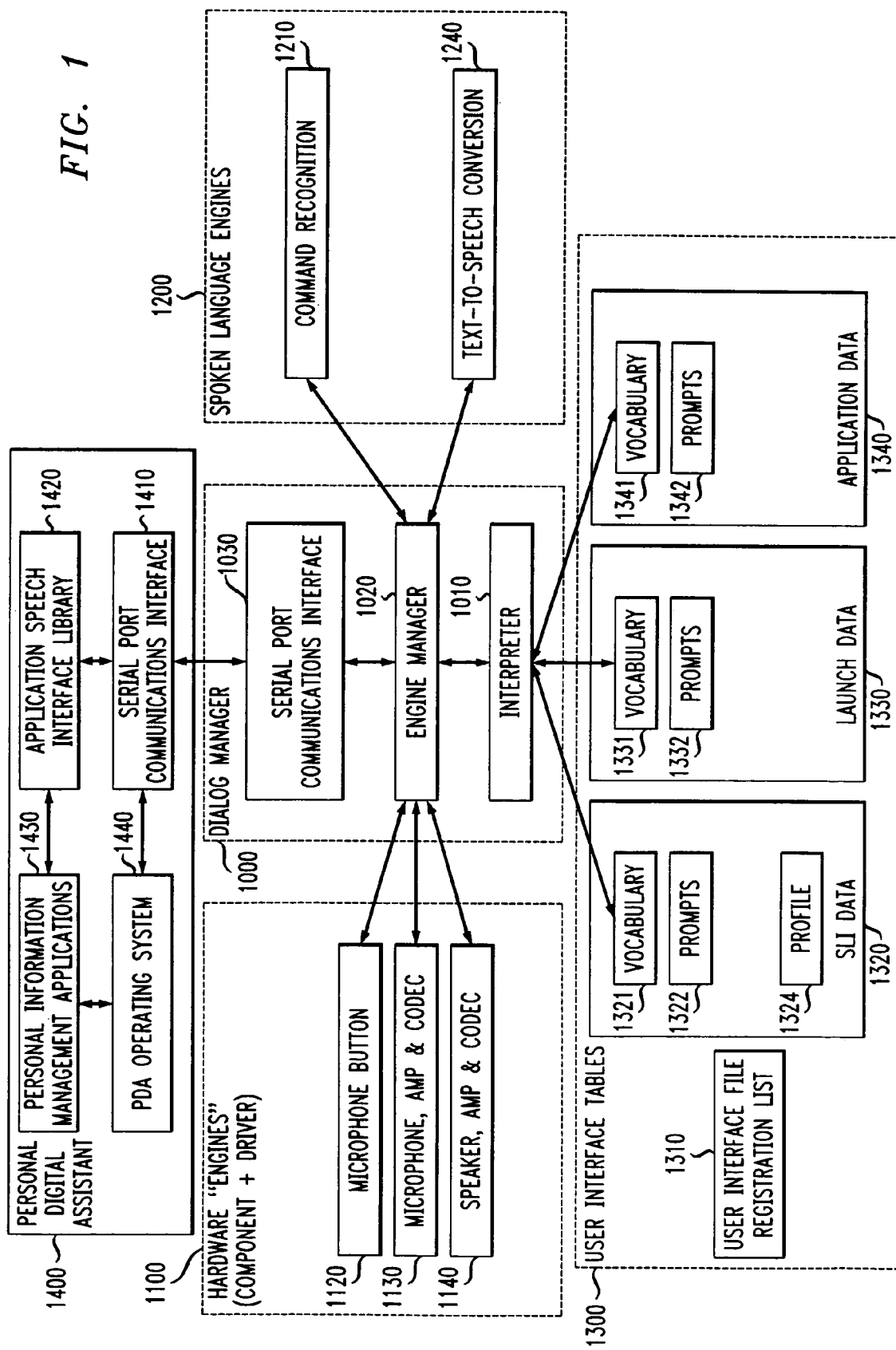
FIG. 1 a block diagram of dialog manager for use in a PSA according to one embodiment of the present invention.
Figure 2:
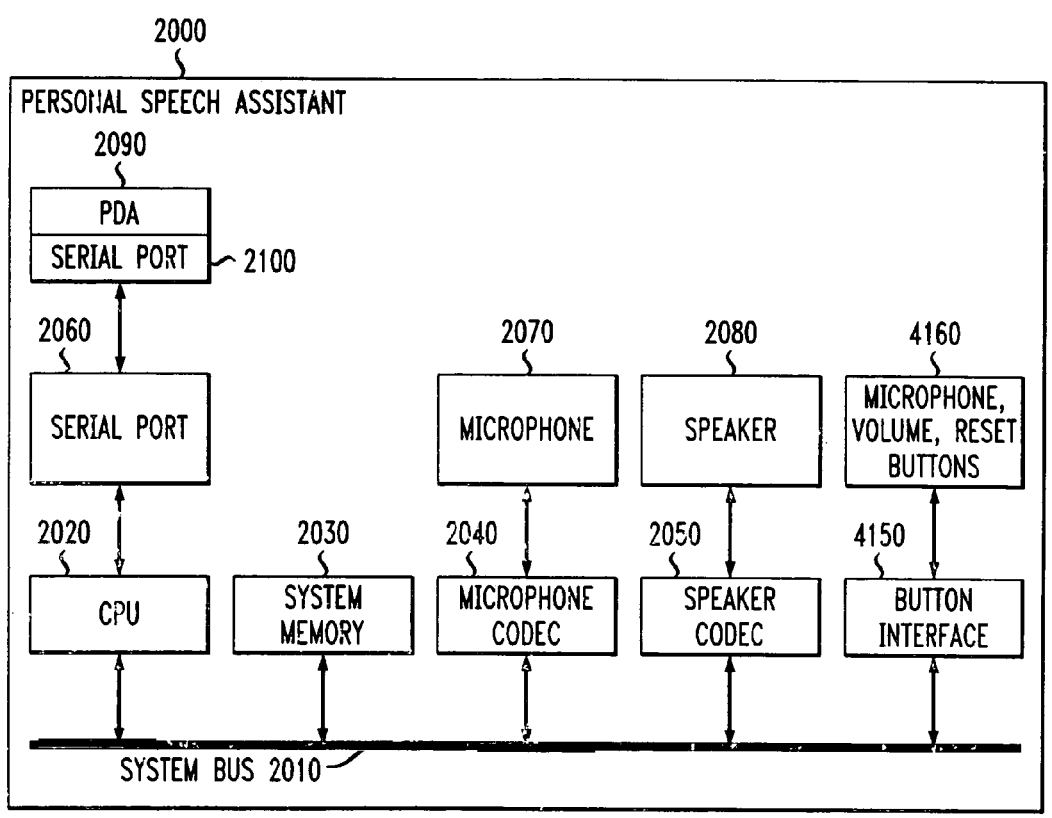
FIG. 2 is a block diagram of a hardware architecture of a PSA according to one embodiment of the present invention.

Referring to FIG. 1, a first implementation of a dialog manager of a PSA and the PDA software which interacts with it to provide services to the user is shown. The PSA and PDA hardware architecture for such an implementation is shown in FIG. 2. It should be obvious to one of ordinary skill in the art that the microphone and speaker in this and other figures could be replaced by any means of analog audio input and output without departing from the spirit of the invention. Further, it should also be obvious that if a microphone or speaker or both are part of the normal composition of the device to be voice enabled, that these or other components may be shared with the enabled device without departing from the invention.

As shown in FIG. 1, the PSA comprises a dialog manager 1000, hardware "engines" 1100, spoken language interfaces

1200 and user interface tables 1300. The dialog manager 1000 comprises an interpreter component 1010, an engine manager 1020 and a serial port communications interface 1030. The spoken language interface engines 1200 comprise a command recognition or speech decoding engine 1210 and a text to speech conversion engine 1240. The hardware "engines," which include a hardware component and the corresponding driver software, comprise a microphone button 1120, a microphone, amplifier and CODEC 1130, and a speaker, amplifier and CODEC 1140. The user interface tables 1300 comprise a user interface file registration list 1310, spoken language interface data 1320 (including vocabulary files 1321, prompt files 1322 and profile 1324), launch data 1330 (including vocabulary files 1331 and prompt files 1332) and application data 1340 (including vocabulary files 1341 and prompt files 1342). The PDA 1400 is coupled to the dialog manager 1000 of the PSA via its own serial port communications interface 1410. The PDA also comprises an application speech interface library 1420, personal information management applications 1430 and PDA operating system 1440.

While other implementations and variations of a dialog manager and user interface tables may be employed in the PSA, a preferred implementation is described following the detailed description of the PSA in a section entitled: "A Preferred Dialog Management System." It is to be appreciated that such a preferred implementation is also described in detail in the above-incorporated concurrently filed U.S. patent application identified by Ser. No. 09/460,961, in the name of L. Cormerford et al., and entitled: "Spoken Language User Interface Manager."

As shown in FIG. 2, the hardware implementation of this PSA 2000 embodiment comprises a system bus 2010 which couples a central processing unit (CPU) 2020, a system memory 2030, a microphone CODEC 2040, a speaker CODEC 2050 and a button interface 4150. The PSA 2000 also comprises a serial port 2060 which couples the PSA to the serial port 2100 of the PDA 2090, a microphone 2070, a speaker 2080 and microphone, volume and reset buttons 4160. It is to be appreciated that the various components of the dialog manager 1000, the spoken language engines 1200 and the user interface tables 1300 are executed in accordance with the CPU 2020 and system memory 2030. The drivers of the hardware engines are also operated in accordance with the CPU 2020 and system memory 2030, with the hardware components being implemented by the corresponding elements shown in FIG. 2.

Figure 3:
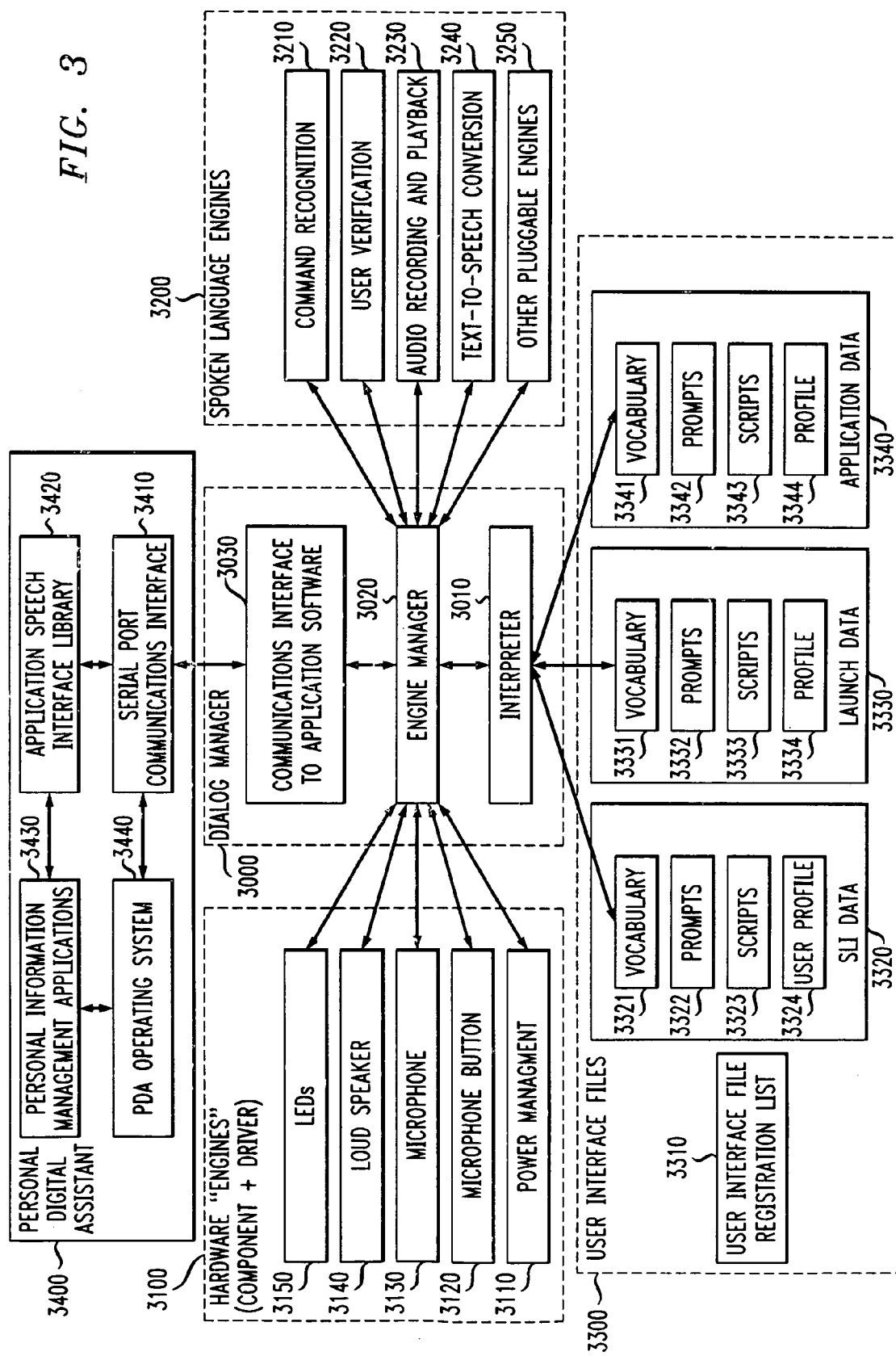
FIG. 3 a block diagram of dialog manager for use in a PSA according to another embodiment of the present invention.
Figure 4:
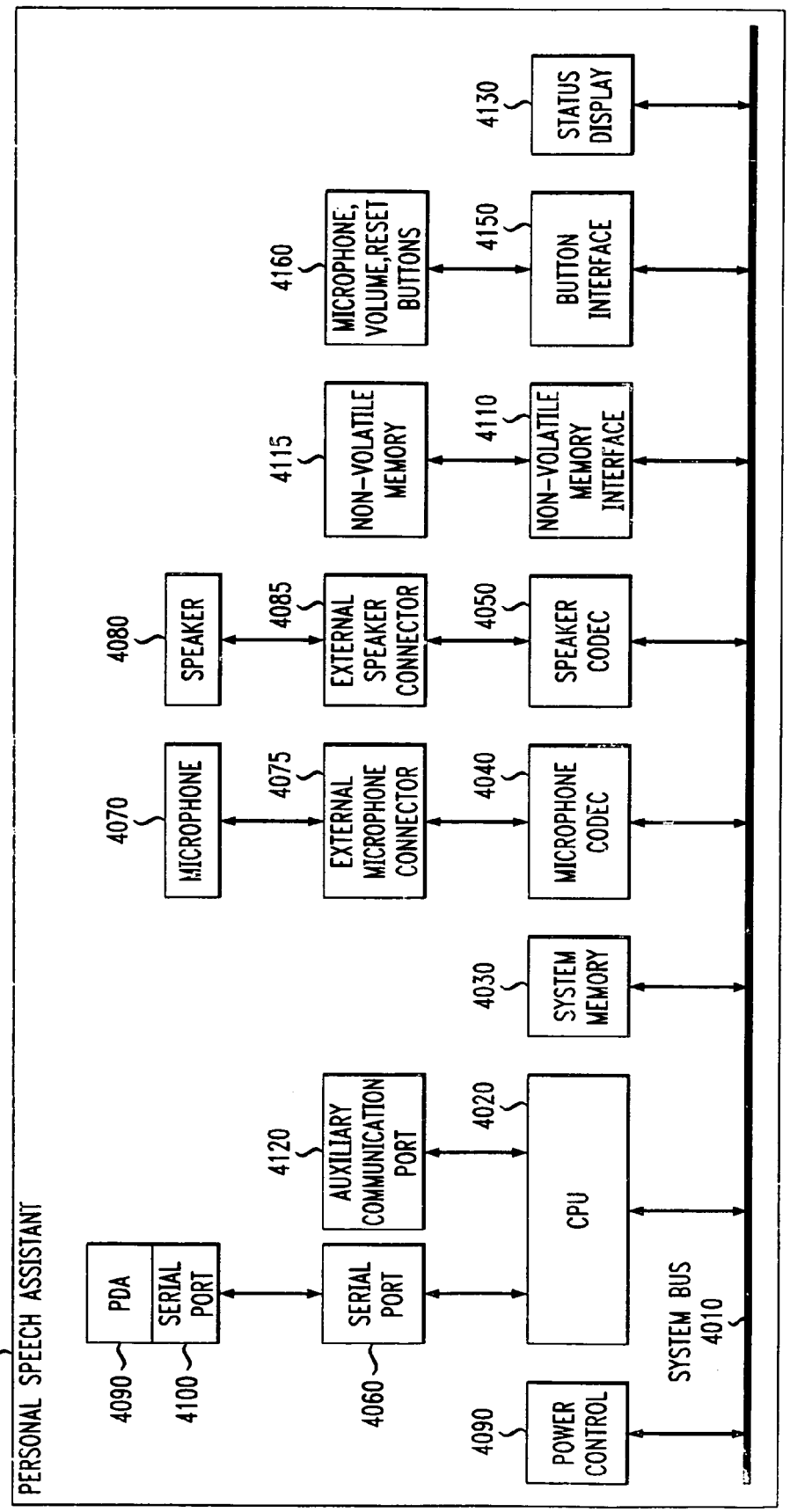
FIG. 4 is a block diagram of a hardware architecture of a PSA according to another embodiment of the present invention.

More advanced and flexible PSAs capable of providing richer interfaces may include multi-ported communications means, nonvolatile memory for recording purposes, additional spoken language engines and other service engines such as encryptors and decoders in hardware or software form as required for the particular instantiation of the invention. Such an implementation is shown in FIG. 3, while a hardware architecture supporting such a PSA is shown in FIG. 4.

For the sake of this description, a PSA will now be described in the context of a PSA for a PDA. It should be understood that those of ordinary skill in the art will find opportunity to apply the PSA as a user interface device to many and varied devices, and that in the course of such application, many engineering changes may be made to the device. Such changes do not depart from the scope of invention.

Interaction with a PDA, as will be described, by means of a PSA, is not limited to spoken language interaction by the PSA. In operation, a user would typically operate the PDA through a conventional interface such as a handwriting interface under some conditions and through the PSA interface under other conditions. In some cases, operations through both interfaces may be used for some operations.

Such a PSA is an intelligent device in the same sense as a PDA or a Palmtop Computer. While such devices are designed to execute application programs such as one which maintains a calendar of appointments and are addressed by the user through a keyboard and/or a stylus, a PSA according to the invention is designed to provide a conversational interface for the user, supplementing character by character data entry, and operation of graphical user interface features, e.g., buttons, tabs, scroll bars, etc.

The use of spoken language to address software applications dramatically enlarges the capabilities which can be implemented in applications. While visual interfaces, i.e., graphical user interfaces or GUIs, offer the simultaneous presentation of data and several application controls, such interfaces are generally limited in their ability to accept commands to those which are represented on the screen. Sequences of control characters can be used but are in general disfavor as they are hard to memorize. Similarly, data presentation is limited to that which a screen can hold.

In contrast, spoken language has no real estate related limitations. Anything which can be said can be said at any time so any command can be executed by the application regardless of what may be displayed by the application GUI. Similarly, data presented through spoken language can be presented at any time and be any length, regardless of the size of the application's GUI presentation.

In a minimal implementation of a PSA only a limited set of spoken language capabilities are provided. One example of a minimal implementation is shown in FIGS. 1 and 2. However, the details of such an implementation overlap those of a richer implementation as shown in FIGS. 3, 4, 5 and 6. Thus, in the following description it will be assumed that the features of the rich implementation are present. Thus, the following detailed description of an illustrative PSA in accordance with the invention will be explained in the context of the embodiments illustrated in FIGS. 3, 4 and 5. However, it should be obvious to one of ordinary skill in the art that, for reasons of economy or simple lack of need, elements of the rich implementation can be eliminated until some minimum is reached. The minimal implementation is shown as an example of a reduced component content PSA which is able to support the impression, from the point of view of the user, of a conversation between the user and the device which the PSA supports, in this case, a PDA. The impression of conversation is conveyed by spoken replies to the user which are meaningful to the user in context, responsive activity in the addressed application and by the ability of the system to detect that the dialog with the user has broken down and that it must be reestablished.

Referring now to FIG. 3, a second, richer implementation of a PSA is shown. it is to be appreciated that the components with like names have like functions as the components in FIG. 1. In this embodiment, the hardware engines further comprise a power management engine 3110, a loud speaker 3140 and LEDs 3150. The spoken language engines further comprise a user verification engine 3220, an audio recording and playback engine 3230 and other pluggable engines 3250. The user interface tables also include spoken language interface data files for scripts 3323, launch data files for scripts 3333 and profiles 3334, and application data files for scripts 3343 and profiles 3344. Otherwise, the PSA of FIG. 3 comprises the same components as shown in FIG. 1.

FIG. 4 illustrates a hardware implementation of this second PSA embodiment. Likewise, components with like names have like functions as the components in FIG. 2. In addition to the components in FIG. 1, the hardware implementation of FIG. 4 comprises a power control module 4090, a nonvolatile memory 4115 and interface 4110, a status display 4130, an auxiliary communications port 4120, an external microphone connector 4075 and an external speaker connector 4085. The auxiliary communications port may provide attachment between the PSA and the PDA through physical means such as wires, radio waves or light (e.g., infrared), or by mixtures of logical and physical means such as computer networks or telephone networks. Also, one of these connection mechanisms may replace the serial connection as the connection interface.

Figure 5:
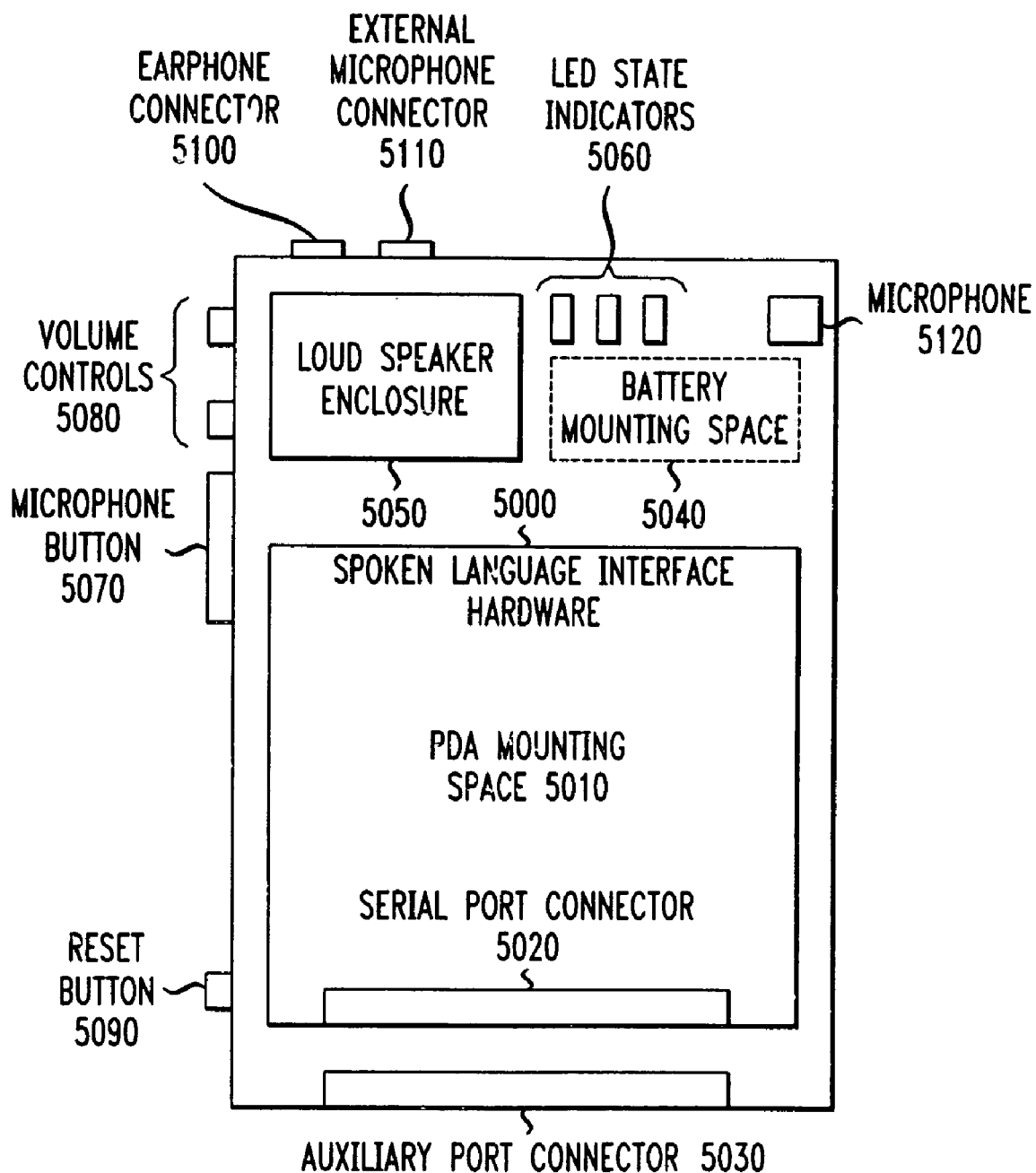
FIG. 5 is a diagram illustrating a top plan view of a PSA according to an embodiment of the present invention.

FIG. 5 illustrates a top plan view of the PSA of FIGS. 3 and 4. As shown, the PSA comprises spoken language interface hardware 5000 which includes all the components shown in FIG. 4 that are not specifically illustrated in FIG. 5, PDA mounting space 5010, serial port connector 5020, auxiliary port connector 5030, battery and mounting space 5040, loud speaker 5050, LED state indicators 5060, microphone button 5070, volume controls 5080, reset button 5090, earphone connector 5100, external microphone connector 5110 and microphone 5120.

Figure 6:
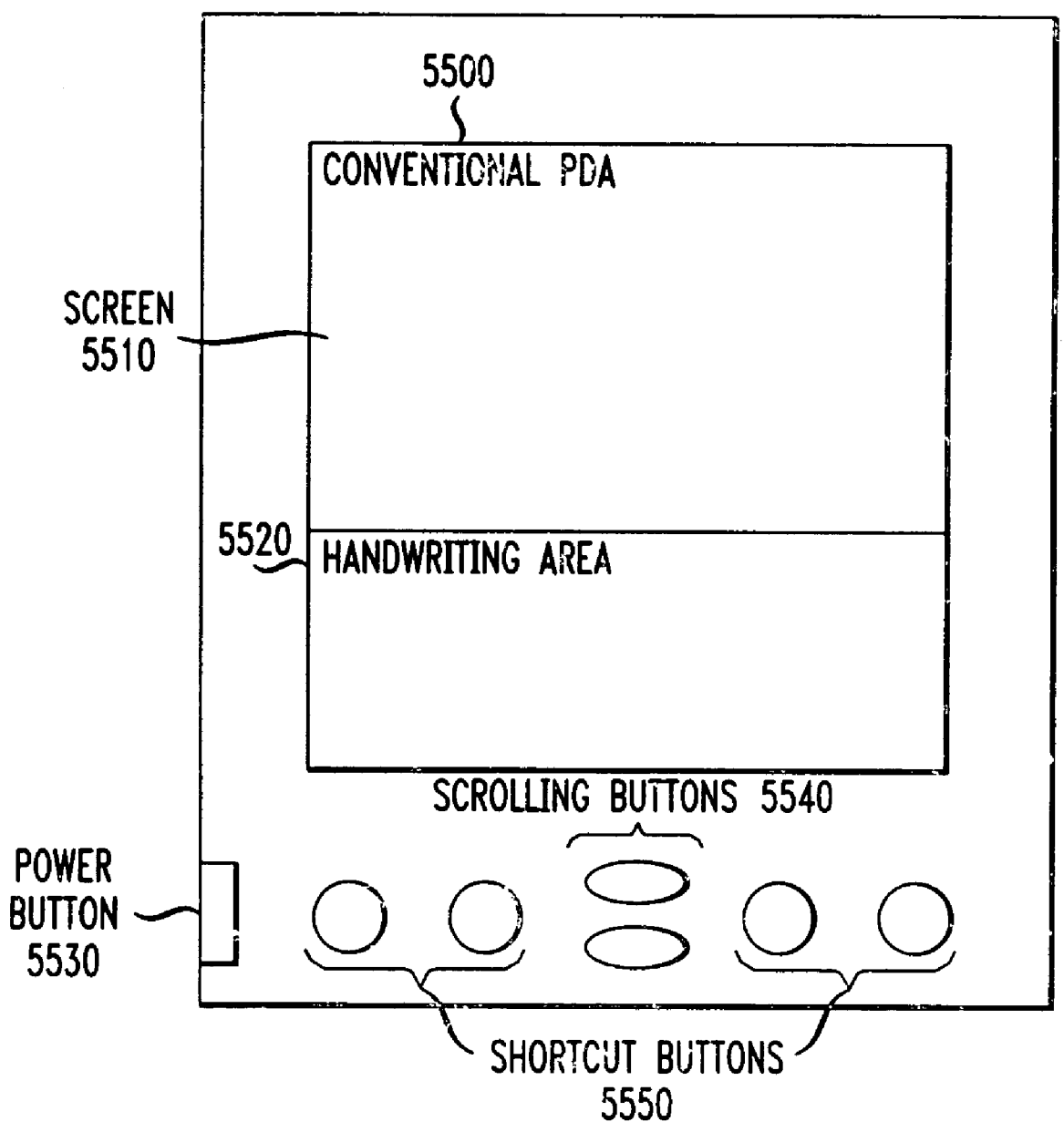
FIG. 6 is diagram illustrating a top plan view of a PDA for use in association with the PSA of FIG. 5.

FIG. 6 illustrates a top plan view of a PDA that may be employed in accordance with the PSA of the invention. Any conventional PDA may be employed. As is well known, a PDA is a handheld computer that generally serves as an organizer for personal information. Such a device typically at least includes such personal information management applications as a name and address book database, a to-do list, and a note taker. PDAs are pen-based and employ a stylus to tap selections on menus and to enter printed characters. The device may also include a small on-screen keyboard which may be accessed by using the stylus to tap the on-screen keys. Some PDAs support a one-stroke handwriting recognition technique known as "graffiti." Further, data may be synchronized between a PDA and a desktop computer (referred to as a "hotsync" feature) via cable or wireless transmission. Examples of PDAs are the PalmPilot manufactured by 3Com Corporation, the MessagePad manufactured by Apple Computer, Inc., and the OmniGo manufacture by Hewlett-Packard Company. Thus, as shown in FIG. 6, a PDA 5500 comprises a screen 5510, a handwriting area 5520, a power button 5530, scrolling buttons 5540 and shortcut buttons 5550.

Given the above-described component content of a rich implementation of a PSA, a detailed description of its operation in accordance with a conventional PDA will now be explained.

Assume that a user has placed a battery in the battery mounting space of the spoken language interface hardware 5000, and placed a conventional PDA 5500, such as a PalmPilot in the PDA mounting space so that the serial connector on the PDA is mated with the serial port connector 5020 in the PDA mounting space The PDA in this example has been supplied with personal information management applications 3430. These applications 3430 are designed to accept voice commands by creating alias names for the graphical user interface names in the standard, non-voice applications. Voice events are supplied to the application event loop by the application speech interface 3420 which in turn receives notification of the user's spoken commands from the serial port communications interface 3410. That interface, in turn, is connected to the user's command utterances through a chain of physical hardware (FIG. 4) and logical processes described below.

Let us trace the creation and issue of a voice event to the communications interface to application software of the dialog manager 3000 contained in the PSA hardware 4000.

As described in the above-incorporated concurrently filed U.S. patent application identified by Ser. No. 09/460,961, in the name of L. Cormerford et al., and entitled: Spoken Language User Interface Manager, and is also described below in the section entitled "A Preferred Dialog Management System," each application which can be addressed by the PSA has a vocabulary file 3341 which contains a table comprising three lists. Corresponding elements on the lists comprise a word or phrase which can be spoken, and the application event and data to which that phrase corresponds.

The user, wishing to find a telephone number, presses the microphone button 4160 which is converted into a software interrupt by button interface 4150. This interrupt is converted into a message in the microphone button device driver 3120 which is then supplied to the engine manager 3020. The engine manager 3020, in turn, formats the button message, and adds additional information such as the name of the message source before passing the message to the interpreter 3010. The interpreter 3010 begins its normal message handling operation by determining whether the message contains a command for which it has a "hard coded" handling function. Finding that messages from the microphone button do have a hard coded handler, it branches to that handler. The handler examines the interpreter's data concerning the status of the dialog manager activity. Finding that there is no other process using the microphone button information, it uses the default definition of the microphone button message target. That target is the command recognition engine 3210. Before sending the microphone button message, the handler determines that the microphone button definition in the current application profile 3344 is absent, so it looks in the launch data 3330 profile 3334. Finding no definition there, it uses the definition in the spoken language interface data 3320 user profile 3324 where a default value is always present. Finding the default value to correspond to "push to talk," it sends a "microphone on" message to the default microphone button target, which is the command recognition engine 3210, through the engine manager 3020, and prepares its own internal data so that the same target will be sent a "microphone off" message when a "microphone button up" message next arrives.

It is to be understood that, in accordance with a dialog manager described herein, by associating profiles with applications, default voicing differences or other behavioral differences can be created for the dialogs of different applications or different application states.

The engine manager 3020 determines whether or not any resources needed by the command recognition engine are in use by other engines or processes. If they are, it halts those activities. Next, it determines whether there are any hardware resources needed by the command recognition engine 3210 which are de-powered for battery conservation purposes or any hardware resources which are powered that can be de-powered during command recognition activity. If either condition is found, the engine manager issues a command to the power manager driver 3110 which tells it which hardware resources to power on and which to power off. The power manager driver executes that command through the power control system 4090 which is routinely implemented using the GPIO (general purpose input/output) lines of the CPU 4020, but could also be done through a bus-connected hardware device as shown in FIG. 4. On completion of the power status update, the power manager 3110 sends a "status OK" message to the engine manager 3020 which then sends the "microphone on" message to the command recognition engine 3210.

On receiving the "microphone on" message, the recognition engine 3210 performs the actions necessary to begin decoding sounds into vocabulary words. This includes, but is not limited to, opening connection to the microphone 4070 through the microphone CODEC 4040 and the microphone CODEC device driver 3120. This typically takes the form of allocating buffer space for audio input data encoded by the CODEC 4040 and informing the recognizer of the buffer location. Having established this connection, a "recognizer ready" message is returned to the interpreter through the already described intermediary activities of the engine manager.

The interpreter 3010, referring to hard coded functions already described, returns a message to the engine manager 3020 to light the LED status indicator 5060 by whose activation the user is informed that the system is listening. Seeing the light, and understanding that the lamp means that the system is listening, the user may say "address book" and release the microphone button. The sound of the user's voice is received by the microphone 4070 and is converted into a standard coded form such as "PCM" which is buffered and accessed by the command recognition engine 3210 by the microphone device driver 3130. The operation of the recognizer is outside the scope of this disclosure. The IBM embedded speech engine is typical of the products offered in the market which will perform the required functions for this system. The microphone up button message, developed as previously described, is received by the command recognition engine, which uses that message to delimit the end of the segment of sound it will process.

In addition to an LED (light emitting diode) indicating the system is listening, other LEDs are provided to inform the user of other aspects of the dialog system status. Typically, these would include a multi-color LED used for display indicating the volume of sound arriving at the microphone, and an LED indicating whether the system is accepting commands or dictation. While these indicators are described here as "LEDs," it should be obvious to one of ordinary skill in the art that other indictors such as LCDs (liquid crystal displays) or graphical artifacts of the addressed application or operating system may be used without departing from the spirit of the invention.

After processing the user's utterance, the command recognition engine notifies the engine manager that a phrase has been recognized and that it is "address book." The engine manager formats the returned word as a message to the interpreter which performs a search of it's hard coded commands, and failing to find the command, a search is made of the current application vocabulary. Failing to find the command in the current application vocabulary, the application launch vocabulary is searched. Here, the word is found and the corresponding command and data are retrieved from the command and data lists. The vocabulary has "PalmPilot" as its target attribute, so the command and data are formatted into a message to the engine manager 3020 by the interpreter 3010. The engine manager, finding the target information in the message, formats it for use by the communications interface 3030 which, using serial port 4060, sends the message to the PalmPilot serial port 4100 of the PDA 4090. Here, the serial port communications software module 3410 transmits all application start commands to the PDA operating system 3440. The PDA operating system 3440 loads and starts the "address book" application in response to this command. The application 3430 on starting execution, executes a notification function in the application speech interface library 3420 which returns a message through the serial port communications interface 3410 to the effect that the current application is the address book. Receiving this message through the serial port 4060, the communications interface 3030 formats the message, including its source for processing by the engine manager 3020. The engine manager 3020 transmits the message to the interpreter where the hard coded instruction for a current application changes the current application name in the data maintained by the interpreter, and that application's user interface data set is made active, consequently deactivating the prior application's user interface data. The user is now able to utter commands which will be transmitted to and understood by the address book application.

Let us say, now, that the user wishes to find the telephone number of a person named "Ed Smith," and that this entry is a part of the private records of the system which is not shown unless the identity of the person making the request is established. The user begins by pressing the microphone button, saying the required command "find Ed Smith" and releases the microphone button. The PSA, by the processes already described, operates the power management, serial port, recognizer, LEDs and data search, finally finding the command in the current application vocabulary. This command is then transmitted to the current application in the PDA which, through ordinary programming methods, finds that this name is not available in any current list of names. This information is returned through the application speech interface, as already described, in the form of a message "play not_found." This message, arriving by the means already described, is processed in the hard coded command section of the dialog manager by searching the user interface files for a prompt, named "not_found." Finding the named prompt in the current application prompt user interface data structure 3332, the corresponding data, the string "no one by that name was found," is extracted from that data structure. This data is formatted targeted to the text to speech converter 3240. As previously described, messages are issued by the interpreter which cause the correct components to be turned on such as the speaker CODEC 4050, and other appropriate components to be turned off, such as the microphone CODEC 4040 as has already been described in the case of recognizing a command word. The phrase "no one by that name was found" is then rendered in accordance with the text to speech engine, as is well known in the art, in an audible form through the speaker 4080 and the execution of the processes described above.

The user, recalling that information concerning Ed Smith is in a private, protected record, then presses the microphone button and utters the phrase "show private records" which is processed and recognized as already described. In this case, the returned phrase "show private records" is found in the current application data script file. The script allows a sequence of operations to be performed. These operations are each performed until the script is completed or an item of the script returns an error. In the case of the "show private records" script, the text to speech engine is used to prompt the user to depress the microphone button and speak for a short period. The user verification engine 3220 effectively measures the user vocal tract and compares its measurements to the known values for the authorized user. Such user verification processes are well known in the art. Finding the speaker is the authorized user, a message is sent to the personal information management application 3430 to add the hidden data to the data which is routinely searched, for the duration of this interaction. The methodology for this is identical to the methods already described.

The user may now command the PDA to "find Ed Smith," and, by the means described, an event will be processed by the application which returns the Ed Smith information in a "say" message to the dialog manager, which, finding it is a hard coded command, uses the text to speech capability to audibly "display" the data, i.e., output to the user via speaker 4080.

This mechanism described above for using fragments of conversation and services of spoken language engines may be broadly applied to the problem of supplying a spoken language interface to applications. An additional feature of the system may be used to improve the conversational quality of the interface. The active SLI (spoken language interface) data files 3320 comprise the user interface data set which is searched in order to find commands or scripts. In any given application, some pieces of data which are part of noncurrent applications may be of immediate interest to the user despite the fact that the thread of the user's work may be in the current application. Further, the normal graphical user interface path which is enabled with speech may require many steps to reach the desired information. A set of commands may be provided in the SLI data 3320 vocabulary 3321 which, rather than being directed to the PDA operating system or the current PDA application, are directed to the application speech interface for processing. On receiving such a command by the same means as have described, the application speech interface sends commands to the PDA operating system to cause access to be made to the data base of the required, non-active application, which it then returns to the PSA by the means already described. A user may, by these means, ask, for example, "when's my next appointment," an appointment book application task, while the current application is, for example, the memo pad.

An additional service that is provided through the dialog manager is that of recording. This service may be used by an application supporting text fields. On uttering the appropriate command, "begin dictation," for example, the interpreter finds the command among its hard wired commands, and performs the actions, as described previously, necessary for storing, or compressing and storing electronic representations of the recorded sounds in the nonvolatile memory 4115 through the nonvolatile memory interface 4110. At the time such a recording is made, the hard coded recording function in the interpreter creates a name for the recording such as a four digit number. This name is then supplied through the previously described means, to the current application, which enters that data, bracketed by "escape characters" into the required text field. Such an entry might appear in the text field, for example, as {0041} or {cantdo}. The application may, as needed, use the hard coded command "playback" in order to hear the recording.

In a dialog manager which provides playback services, the search for a prompt may be performed by first searching for a recording with the requested prompt name. This will allow applications to use recorded prompts in "rich" dialog manager systems, or text to speech in more minimal systems.

II. A Preferred Dialog Management System

With reference to the dialog manager and user interface files of FIG. 3, the following is a further detailed description of various features of a dialog management system mentioned above as well as a detailed description of other features which may be employed in accordance with the PSA of the invention. As previously mentioned, the dialog manager 3000 contains two major components; an Engine Manager 3020 component and an Interpreter 3010 component. The Engine Manager 3020 component provides data and control connections to all components which may play a role in the spoken language interface. This includes software engines 3200 and "engines" 3100 comprising a hardware component and a software driver. Software engines may include, for example, a command and control speech decoding engine 3210, a text to speech encoding engine 3240, a recording and playback engine 3230, a user identity verification engine 3220, and other engines 3250 which may be required in particular implementations. Each of such engines has initialization and shutdown requirements and an Application Programmer's Interface through which the services of the engine may be obtained. Hardware engines may include, for example, power management devices 3110, a microphone button 3120, a microphone, amplifier and CODEC 3130, a speaker, amplifier, and CODEC 3140, LEDs 3150, and other hardware engines which may play a role in the spoken language interface. It should be obvious to one of ordinary skill in the art that engines which are not obviously related to spoken language may still play a role in a spoken language interface. Examples of such engines may include protocol managing engines for telephony or Internet connection, a tablet manager for hand writing support, or a cryptography engine for e-commerce support. Other engines will occur to those engaged in implementing instances of this invention. The method of adding engines either through a "plug-in" interface, a means well known to those skilled in the art, is one means of "scaling" the Dialog Manager. Engines may also be added by adding code to the Engine Manager component to support the new engine's properties. Both plug-in and code support result in an engine to engine-manager connection supporting standard messages.

The Engine Manager 3020 makes the services of the engines available through a messaging interface. Messages may be either commands to the engines (such as Say-This-Text) or reports from the engines (such as Playback-Completed). Commands may be common to all engines (such as Begin or Halt) or unique to the services the engine provides. Further, elements of the supported device (system and/or application 1400) may be treated as engines by the Engine Manager. Examples of these include push buttons which, through the medium of a software driver, can initiate "Button Pressed" or "Button Released" messages, LED lamps which may respond to "Turn-ON" or "Turn-OFF" messages, Power conditioning chips which can respond to "Turn-Off" messages or create "Power-Status" messages. Similarly, an "engine" providing communications services provides the means for transferring commands and data between the dialog manager and the applications or devices employing its services. This is shown as Communications Interface 3030 which provides such an interface to the system and/or application the user is employing the dialog management system of the invention with which to interact, in the case of one embodiment of the PSA, this is PDA 3400.

Accordingly, the dialog manager 3000 through the use of the hardware engines 3100, spoken language engines 3200 and user interface tables (files) 3300 provides the user with a conversational spoken language interface with the PDA 3400. Mechanisms are provided to support "conversations" between the user and multiple devices including the profile feature allowing the sound of a given applications voice to be unique and the "target" value associated with each vocabulary 3321, 3331, 3341, or potentially each vocabulary entry.

The Interpreter component 3010 receives the messages created in the Engine Manager 3020 and uses them, in accord with its internal logic, to reference either its own hard coded instructions, or to reference the User Interface Data Tables 3300 provided by the application software to find appropriate instructions to send to appropriate or indicated targets. In the elementary case, the Interpreter component is a table driven interpreter. This supports a simple conversion of messages between the computing system's components and the user. In more advanced versions, other methods such as statistical or neural network or "fuzzy logic" methods may be applied to message conversion without departing form the spirit of the invention. Regardless of the means employed by the Interpreter to perform selection, the actions which it may select are determined by its collection of hard coded instructions and by the contents of the User Interface Tables initially provided by the software application writer.

There are four kinds of User Interface Tables which are employed by the Interpreter. These are vocabulary tables (3321 for Spoken Language Data, 3331 for Launch Data and 3341 for Application Data), prompt tables (3322 for Spoken Language Data, 3332 for Launch Data and 3342 for Application Data), hardware profiles (3324 for Spoken Language Data, 3334 for Launch Data and 3344 for Application Data), and scripts (3323 for Spoken Language Data, 3333 for Launch Data and 3343 for Application Data). Other types and forms of user interface data such as, for example, finite state grammars or other description of fragments of interface behavior may be employed in embodiments of this invention without departure from the spirit of the invention.

Given the overall description of component functionality provided above, an illustrative embodiment of a preferred dialog management system of the invention will now be described. Thus, let us consider the particular PDA example cited above, in detail, in order to further understand the structure and operation of the invention. For this description, phases of operation and forms of dialog support will be treated in isolation to aid understanding.

(A) Spoken Language Interface (SLI) initialization

Spoken language user interface tables 3300, and spoken language engines 3200 are initialized at turn-on time in order to establish a default set of behaviors. The default behavior may by modified by any application or by the user.

In a PC environment, the values for initialization parameters may be stored in hard disk files. In other systems, such as a PDA, they may be written in ROM memory or Flash Memory or any other conventional storage means including remotely connected databases and initialization servers.

User Interface Tables 3300 are initialized by parsing data files and storing the data in data structures by entirely conventional means. Similar actions can be performed using "flash memory" or ROM in embedded systems. In ROM based systems, the ability to update user interface data structures is limited. New applications are added to the collection of spoken-language-capable applications by adding at least one user interface file and by adding an entry in the user interface initialization file shown in FIG. 7. It should be understood that variations or alternatives to this method of initialization will occur to those of ordinary skill in the art and do not depart from the spirit of this invention.

Engines are initialized by calling parameter setting functions supported in the engine. In the case of button "engines" or other hardware related settings, these functions are located in the hardware device drivers.

The initialization process can now be described with reference to the figures. As previously mentioned, FIG. 3. shows a high level view of the dialog manager 3000 and its spoken language engines 3200, hardware engines 3100 and User Interface Data Files 3300.

The User Interface Data Table 3300 contains a File Registration List 3310 illustrated by the example in FIG. 7. This table contains two major sections, one listing files to be loaded into data structures for use with those parts of the user interface that are always present, i.e., those which address the spoken user interface and the application launch functions of the operating system, the other listing files that are to be loaded into data structures for use with those parts of the user interface which are present only when the specified application is active. Here, it should be understood that "application launch" refers to the stand function of an operating system in which the binary image of the application is loaded into working memory, if it is not already present, the operating system prepares a task, thread or other processor cycle resource to that application, and, subsequently makes all or some non-zero amount of processor execution cycles available to that application. Upon "launching" an application may be said to be "executing" or "active."

Conventional methods are used to load this registration file into a data structure in memory and then to use the information it contains to load each of the files it lists into their own data structures. As each vocabulary (3321, 3331, 3341) file is loaded, the name of the application using that vocabulary is stored in the "command_target" element of the data structure (FIG. 11B) allocated for each vocabulary. With these files in memory, the initialization can proceed to setting the default parameters of the Spoken Language engines 3200.

Default settings for the command recognition engine include, at least, loading it with or enabling the vocabularies SLI vocabulary 3321 and launch data vocabulary 3331. These default vocabularies are always available so that the user may speak to the dialog manager, which is always active, or to the operating system, which is also always active, in order to change applications.

Among the User Interface Data files 3300, an SLI User Profile 3324 can be found. This profile contains data in the form of a table in which a data item name and a data item appear in pairs so that the correspondence between a data item name and a data item can be easily and unambiguously established. Such a data file is illustrated in FIG. 9.

Profiles are not always provided with an application. If a profile is not provided with an application, the dialog manager will treat the SLI profile as a default and use it's values. This makes the SLI profile the natural place to store user preferences. Further, a profile is not required to specify all settable hardware properties. It is unlikely, for example, that an author of a datebook application would be concerned about whether the microphone button operated as a push-to-talk button or a toggle-on-toggle-off button. Such an author may, however, wish to adjust the speech sounds of the text to speech engine in order to give a distinctive voice to that application. In the event that a profile item is unspecified in an application profile 3344, the values which are unfilled are chosen from the SLI user profile 3324. Finally, some profile value may be associated with the act of launching a new application, such as converting the microphone button to a toggle-on-toggle-off button and setting it to the on state.

Figures 8, 9:
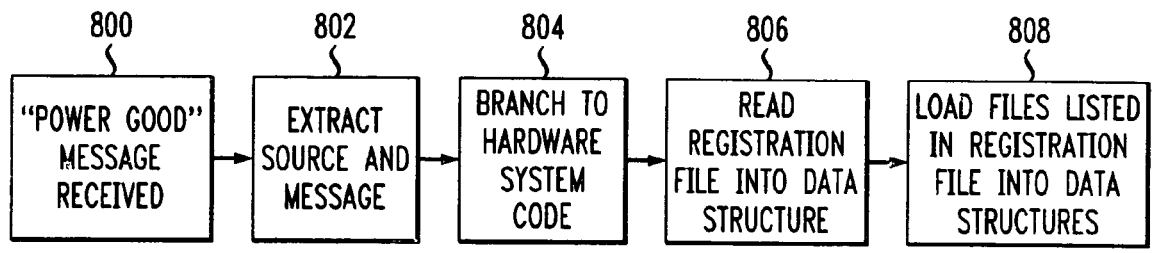
FIG. 8 is a flow diagram illustrating one embodiment of an initialization process of a dialog management system according to the present invention.
FIG. 9 is an exemplary user profile data file for use in accordance with one embodiment of a dialog management system according to the present invention.

Following the flow chart in FIG. 8, in step 800, the hardware power management component (3110 of FIG. 3) sends a "power good" event to the Engine Manager 3020. This event is formatted into a message containing the message source (the hardware power manager) and the message content, which is then placed into the message queue of the Interpreter 3010. It should be understood that the Interpreter message queue differs in no significant way from the conventional message or event queues commonly used in event driven programs. It also should be understood that the format of the messages created by the Engine Manager makes provision for more data fields than are used in this case. Further, it should be understood that the Engine Manager may make provision for data fields not included in this embodiment without departing from the spirit of this invention.

At this point in the operation of the invention, the Interpreter 3010 message queue is guaranteed to be entirely empty since the absence of power prior to this event precludes the generation of any messages. Since the message queue is scanned when the Interpreter 3010 is not otherwise busy, the "power good" message is unloaded from the message queue immediately. The Interpreter parses the message 802 using entirely conventional methods to extract the message source and the message content. The Interpreter compares the message source with a list of hard coded message sources (including hardware, engines, and applications), and, finding the message is from a hardware system, branches to its hardware system code 804. In a minimal implementation, this code can be implemented as a standard "C language" cascade of "if . . . else if" statements, which we will call a "hard coded" sequence of functions. Table driven methods, to be discussed below, may also be used for greater flexibility, but are not essential to the operation of the invention in the initialization phase since all user input to the process may be made through the data file of FIG. 9. The hardware system code 804, on receiving the power good message, parses the hardware profile shown in FIG. 9 by entirely conventional means, and for each parameter calls a function which sets that value 806 as the default value for that parameter for the appropriate engine. Examples of such parameter setting code may be found in the tool kit for IBM ViaVoice.

The aspects of spoken language dialogs which can be initialized also include, but are not limited to, microphone button type, audio output volume, and text to speech vocal track properties. Microphone button types include push-to-talk, toggle-on-toggle-off (microphone on or off) and push to toggle (on) with time-out (off). Voice operated microphone switches can also be supported and initialized with turn on or off keywords. Text to speech encoders such as the Eloquent Technologies system can be initialized with the speaker characteristics such as gender, volume, speed, roughness, breathiness, head size, pitch fluctuation, pitch baseline, and quality.

It should be understood that an additional profiles may be part of the UI data set of any application and that the values used in the application profile for a given application will be used to reinitialize engines when an application is made active.

On completion of the initialization of the of the Spoken Language engines 3200 and the working parameters of the Dialog Manager 3000, the hardware system code continues by loading 808 the remainder of the files in the User Interface Files 3300 data collection into conventional data structures. The form of examples of such files and their corresponding data structures are shown in FIGS. 11A and 11B for Vocabulary files and FIGS. 12A and 12B for prompt files, 3321, 3331, 3341. FIGS. 14A and 14B show a script user interface file and a sample script file.

Figure 10:
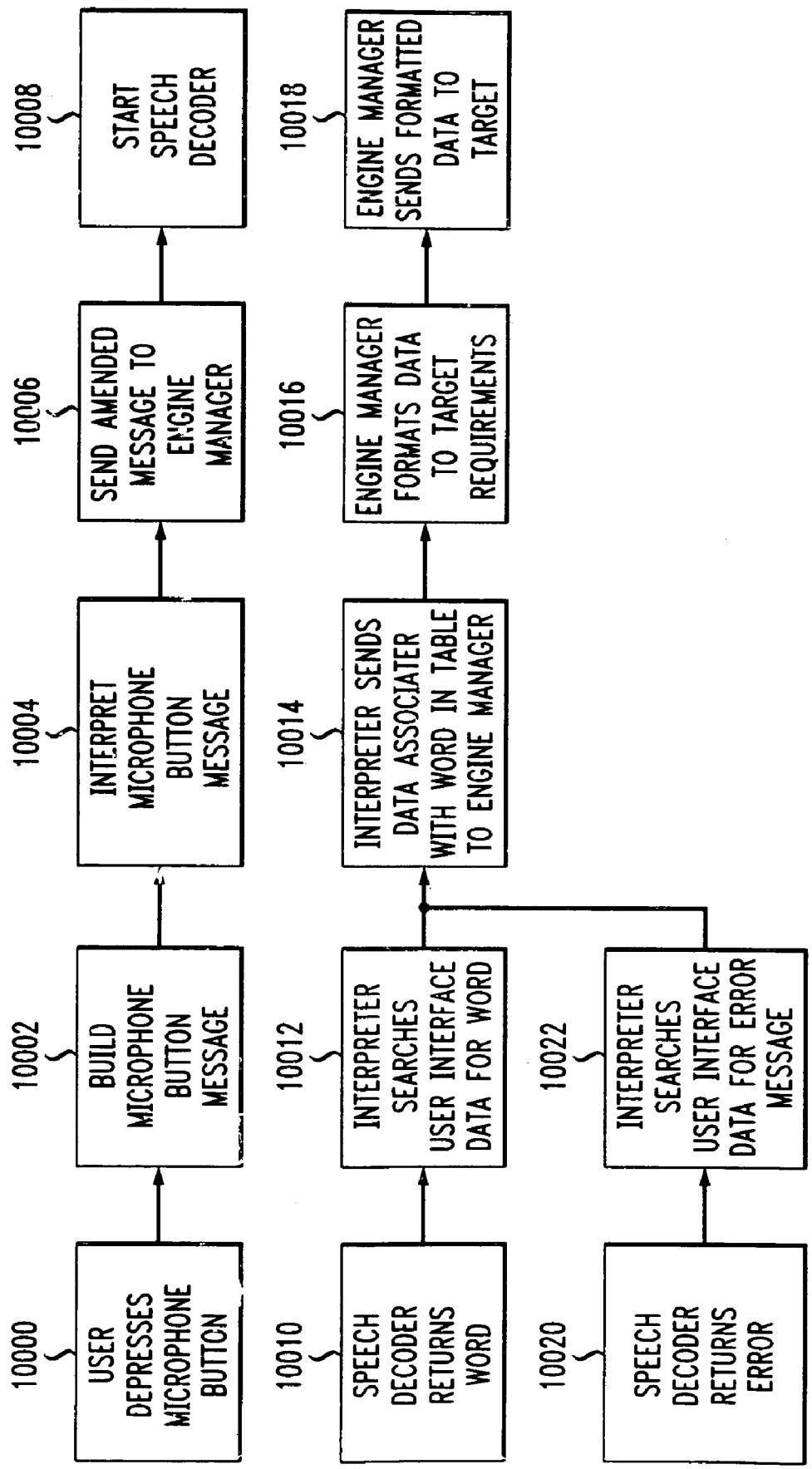
FIG. 10 is a flow diagram illustrating an example of a portion of a user transaction with a dialog management system according to the present invention.

Once initialization completes, the dialog manager 3000 is ready to support transactions which further the goals of the user. FIG. 10 shows the beginning of a transaction initiated by the user. The user begins by pressing the microphone button (10000). The button pressing event is reported via the button software driver 3120 to the Engine Manager 3020 which formats a message (10002) reporting the event parameters to the Interpreter 3010. The Interpreter 3010 examines data on the current state of the dialog with the user and, determining that no other activity is awaiting a microphone button message (10004), sends the message to the Engine Manager with the default target, e.g., the Command Recognition Engine 3210 (10006). The Engine Manager then formats the message into the form required by the Command Recognition Engine 3210 which, accepting the message, connects to the microphone through its amplifier, CODEC and software 3130 (10008).

The command recognition engine (also referred to as a speech decoder) operations are outside the scope of this invention which strives simply to provide an integration of the services of this and other engines in order to support the illusion to the user of attention and cooperation on the part of the addressed object such as the PDA used in this embodiment. In the normal operation of such engines, a status message is returned by the engine to the software system which initialized it. This status message may be either in the form of a recognized word (10010) or a error (10020).

In the case that a command word is recognized, it must necessarily be a word in a command vocabulary (3321, 3331, 3341) which was installed during the initialization process. A typical vocabulary is shown in FIG. 11A. For the sake of this example, assume that the user has said "Address book" which is a member of the application launch vocabulary 3331 called "launch.voc" indicated in FIG. 7. The list of "strings" stored in the set of vocabulary data structures of the form shown in FIG. 11B is searched (10012) by successively comparing the element "spoken_command" with the recognized word "address book." When the search returns, the index of the element (its position in the array) that was found is used to find the corresponding command and data elements in the command_string[ ] and data_string[ ] arrays, respectively. The identity of the vocabulary, i.e., launch.voc 3331, is used to establish the target of the command and data as the application launching system call, while the command to launch and the name of the application to launch are found in the command and data strings. In addition, initiating the processes of launching the application by sending a message to the Engine Manager, the Interpreter notes in its working memory, that the current application is the address book so that future recognized words will be searched for in the command vocabulary 3341 of that application. Similarly, the Interpreter activates the address book vocabulary in the command recognition engine 3210 so that it is capable of recognizing the command words listed in the user interface vocabulary files 3321, 3331, 3341.

It should be noted that the vocabulary file system permits any number of spoken commands to correspond to the same command and data. This allows the creation of synonyms for command words or phrases to improve the recognition accuracy obtained by a given user or simplify the user's task in memorizing the command set. This is illustrated in FIG. 11A where the spoken commands "address," "address please," and "what is the address," each has the same associated command and data, and hence produces the same sequence of events when recognized.

Continuing with the example, assume the user depresses the microphone button and says "find smith." The process depicted above repeats, following steps 10000 through

10018 of FIG. 10, as before, and finds the string "find smith" in the data structure typical of FIG. 11B containing the particular data shown in FIG. 11A. The Interpreter is now able to use the identity of the source vocabulary 3341 to identify the target as the executing application "Address Book" and to send it the command "find smith" through any conventional command channel 3030 of the kind used by those of ordinary skill in the art to implement inter process communication in computing systems. The address book application, having been supplied with a command and the data needed to execute that command can then find and return the information on "smith." The structure of such applications is known to those of ordinary skill in the art of programming applications and is outside the scope of this invention.

Thus, the above-described portion of this process is further illustrated in FIG. 10. Once the speech decoder 3210 returns the recognized word (10010), the Interpreter 3010 searches the User Interface Data 3300 for the word (10012). In the case where the speech decoder returns an error (10020), the Interpreter 3010 searches the User Interface Data 3300 for the appropriate error message (10022). In either case, the Interpreter sends the data associator with the word (or error message) in the table to the Engine Manager 3020 (10014). The Engine Manager formats the data to the appropriate target requirements (10016), e.g., in the case of the recognized phrase "find smith," the requirements of the Address book software application. The Engine Manager then sends the formatted data to the target (10018).

Figures 12A, 12B, 13:
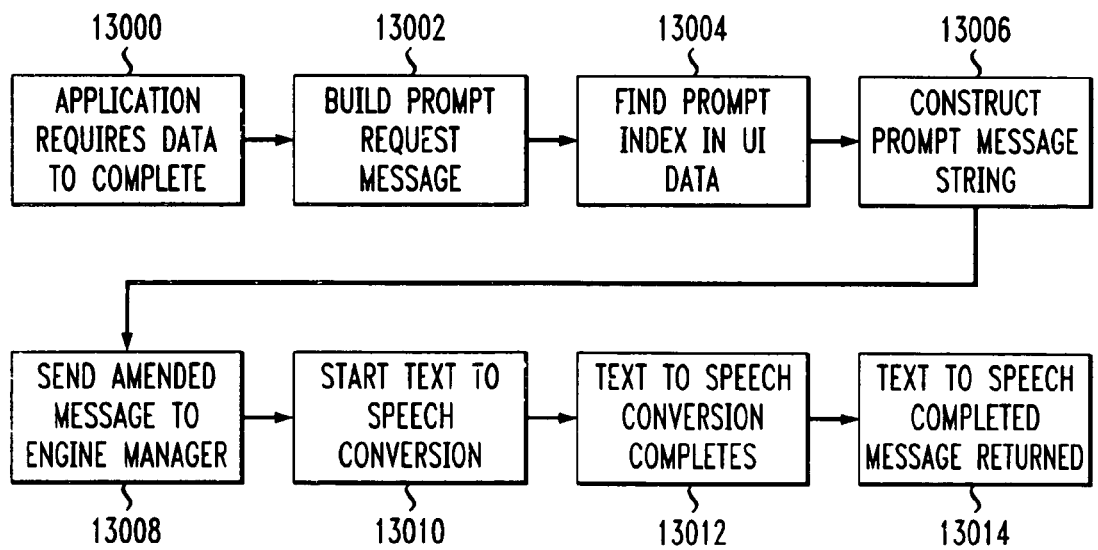
FIG. 12A is a exemplary prompt data file for use in accordance with one embodiment of a dialog management system according to the present invention.
FIG. 12B is a exemplary prompt data structure for use in accordance with one embodiment of a dialog management system according to the present invention.
FIG. 13 is a flow diagram illustrating an example of another portion of a user transaction with a dialog management system according to the present invention.

Continuing this example, assume that there are more than one persons named "Smith" listed in the address book application data base. In an application written for use with a GUI, the GUI might return a GUI dialog displaying a list of persons named "Smith" in order to get the information (which Smith) that it needs to complete servicing the user command. Referring now to FIG. 13, an example is provided for the process employed by the Spoken Language Interface Dialog Manager of the invention to handle this occurrence. Thus, it is determined that the target application requires data to complete servicing the user command (13000). An application written to take advantage of a Spoken Language Interface Dialog Manager could, in addition, send a message (13002) through the Communications Interface 3030 to the Interpreter 3010. This message, as with the message from the Command Recognition engine 3210, contains a data field giving the source of the message as a software application. The command content of the message is, in service to the application's purpose, a request to the Interpreter to "play" a prompt from the User interface prompt data file 3341. In the case of this example, the prompt requested is identified as "many." Using a search procedure identical to the one described above for vocabulary search, the index value associated with the prompt index string ("many") is found (13004) in the data structure containing the prompt data 3341 (FIG. 12A) for the current application (FIG. 12B), and the prompt string is found at the same index value of prompt_array of the same data structure.

Next the Interpreter examines the string. If no escape characters (such as %1 or %2) are found in the string, the job of formatting the string is completed (13006) simply by finding the string. In the case of the address book prompt "many" in this example, two escape characters are found. These may be supplied in the data segment of the message which was originally received from the software application. These values can then be inserted into the prompt string to replace the corresponding escape characters, completing construction of the prompt string (13006). Many alternative methods for supplying this data will occur to those of ordinary skill in the art without departing from the spirit of the invention, for example, using a sequence of messages to write data to scratch pad variables maintained in the working memory of the Interpreter prior to sending the prompt message.

An additional feature of the prompting system allows the Dialog Manager 3000 to provide instruction and queue user responses in a manner which helps support the illusion of understanding and cooperation. In the course of operation, the user may be required to perform activities, such as recording dictation, which require that the user follow a procedure. The Interpreter maintains an internal data set in which data on the date and time at which each procedure was last performed, as well as a count of the number of times the procedure was performed in the past is stored. By means of a simple policy, the user's experience is scored and a prompt is chosen from a set of prompts with varying amounts of detailed instruction based on that score. Thus, if the user has recently used the procedure, the prompt may merely say "Ready," while if the accumulated experience isn't great or recent, a more detailed prompt may be selected. This system of prompts can operate in the opposite direction in selected cases. For example, if the user says "Help" and the Dialog Manager replies with a short prompt like "Say the name of the application," the user's second request for "Help" following closely on the first could cause more complete prompts and guided activity. The "script" capability described below may be used within the Dialog Manager or a given application to support this capability. A detailed description and illustrative flow diagram of such a novel tapering feature using prompts will be explained below in the context of FIG. 16.

Continuing, having completed the prompt string, the string is included in a message from the Interpreter, sent to the Engine Manager, and targeted at the Text to Speech (TTS) Conversion engine 3240 (13008). The Engine Manager then halts, as part of its normal operation, any engine activity which may be using resources needed by the Text to Speech Converter. The TTS engine is then made to convert the string into audible synthetic speech (13010) using the CODEC amplifier, and speaker driver 3140 connection supplied by the Engine Manager 3020. Upon completion of the Text to Speech conversion (13012), a message is generated by the Engine Manager (13014) which is returned to both the Interpreter and the software application. This message alerts the Interpreter that the resources it had reserved for the TTS operation can be made available to for other operations. The message informing the software application that the TTS operation is complete allows it to proceed to other Spoken Language Interface operations which may be required to serve the user's purposes.

The mechanisms which support the partial dialog described above are not observed by the user. Rather, in all the activity described above, the user only knows that after pressing the microphone button and asking for the address book, the address book application appeared and began to function, and that after pushing the microphone button and saying "find smith" the PDA replied meaningfully by saying (for example) "there are five people named smith on the list." Supporting prompt, meaningful responses to commands supports the impression of the user that the system understands and cooperates. Returning for a moment to step 10020, it may occur that the Command Recognition engine is unable to find the word that was spoken in its vocabulary 3321 or, determined that, although the microphone button had been depressed, the volume of sound it received through the microphone connection was insufficient. In such an event, an error message rather than a recognized word is sent to the Engine Manager. As in the previous parts of this example, the Engine Manager formats a message to the Interpreter containing the source of the message and the data identifying the error. This event is fundamentally the same as the case shown in FIG. 13 in which an application requires data to complete, except that the prompts which are accessed are indexed by the error type and stored in the globally available part of the User interface data files. The system might, depending on the specific content of the prompt files, say "Please speak louder" in response to a low volume error, or "Please use command words" in response to a word not recognized error. By these means, the user is given the impression that the system is cooperating in trying to keep the dialog in a working state.

It should be obvious to one of ordinary skill in the art that the mechanism of targeted vocabularies, prompts, scripts and engine management described above is applicable to addressing targets other than a software application resident in the same computing system. The user may, if vocabularies and prompts are supplied, address the dialog manager itself, changing initialization parameters such as the speed of synthesized speech by means of a spoken command, such as "speak slower." This further supports the illusion of understanding on the part of the dialog manager.

(B) Shortcuts

In the normal course of application use, the user may find that some service or piece of information provided or managed by an application other than the current application, is needed in order to further some task. As described thus far, a command word returned by the command recognizor is searched for first in the current application vocabulary 3341, then in the application launch vocabulary 3331, then in the dialog manager vocabulary 3321. Failing to find the word returns an error which is spoken to the user through, for example, the text to speech encoder. It is possible to operate the dialog manager using a variant of this approach in which the error message is not returned until all command vocabularies have been search and the word is found to be absent from all. In the event that the word is found in the vocabulary 3341 of an application which is not active, and the supporting operating system allows multitasking, the Interpreter may provide a sequence of messages to the Operating System through the medium of the Engine Manager 3020 and the Communication Interface 3030 which cause the application named in the command_target field of the data structure in which the command word was found to execute and return the data or service requested. Such a sequence of commands may be described in a file called a script. Many scripting languages are commonly in use in the computing world today including, for example, Pearl, Python, and JAVA Script, any of which could be used with appropriate software support in the Interpreter.

Scripts for other purposes may also be written for complex services required within a given application and invoked by messages from executing applications. This is another example of scaling the dialog manager. FIG. 14A shows a script user interface file and FIG. 14B shows an example of a script pseudo-coded in a "C" like syntax. An application calling this script would cause the sequence of dialog manager services to be executed in order. Thus, the Engine Manager 3020 would first be told to direct microphone button messages to a user verification engine 3220 which can recognize the voice of a particular user rather than the words which the user speaks. Such engines are commercially available and are outside the scope of this invention. The text to speech engine is then made to speak instructions to the user. The user, following instructions, depresses the microphone button, causing the user verification engine to execute through a sequence of events fundamentally similar to those for command word recognition except that the variable "OK" is set to the Boolean value "true" or "false" before being returned to the calling application. Before the value is returned, the Engine Manager is restored to its default condition in which the microphone button messages are routed to the command recognition engine.

While a preferred method for providing scripts to the user interface is through the script user interface file and data structure methodology, scripts may also be provided or referenced in vocabulary user interface files and data structures. This feature allows a simple user interface design to be incrementally improved or adapted and leaves the decision to separate scripts from simple commands up to the user interface programmer. In the normal course of events, scripts are named in the data area of a vocabulary entry and are found by de-referencing the script from that index in the script user interface data file. FIG. 14A shows such a file in which scripts are given an index string (in the first column), a target interpreter (in the second column) and a script file name or in-line encoding (in the third line column).

Script files are text files containing a program in a scripting language (for example "Python"). When a vocabulary word is recognized by the command recognition engine 3210 and the recognized word is found in an active vocabulary 3341 file by the interpreter 3010, the associated command may be "python" and the associated data may be the name of a file surrounded by brackets ("{" and "}" for example). In this case, the interpreter, finding the "python" command extracts the name of the file and, through the normal mechanisms of the dialog manager, starts the script interpreter engine, which, loads and executes the script file. The interpreter engine is able to access all functions and capabilities of the dialog manager and its engines so that application programmers are able to create any complexity of conversational behavior which can be created in a program. Alternatively, small python programs can be included as data in a vocabulary (3321, 3331, 3341) file, in which case the python engine is sent the program itself rather than file reference case. This is made distinguishable to the interpreter 3010 by using the command "run," for example, rather than "python."

Many software applications which employ spoken language in their interface may need to make or play recordings. A playback and recording engine 3230 is therefore a logical addition to the set of spoken language interface engines. Unlike text strings stored in prompt files or vocabulary files (3321, 3331, 3341) containing spoken word to command and data correspondences, the data created by and used by such an engine consists of large data sets formed in, for example, a pulse code modulated (PCM) format. Such data sets are stored in files so that reference can be made to them by file name. If a file is provided as part of an application or is created or obtained by an application, that application knows the name of the file. The application can call on playback and other services of the Dialog manager by issuing commands that are built into the Interpreter. The Interpreter, on receiving a message which has the an origin in the Communication Interface 3030, searches its list of built in commands instead of its vocabulary files (3321, 3331, 3341) to find the required action. This list of commands will typically contain, but need not be limited to, playback (a named file), say (a text string), record (a new file name).

The Interpreter is also able to process commands which do not produce an immediate effect that is immediately perceivable to the user. These include commands generated by the Interpreter and accepted by the Interpreter. An example of an Interpreter generated command is found in power management support. Since the Interpreter is "aware" of which Spoken Language Interface engines are in use at any given time, it is in a unique position to contribute to the power management activities of the system containing it. An example of this could be turning off audio output power amplifiers while the Command Recognition engine is active or more generally when no service such as Text to Speech or Recording Playback needs the amplifier capability.

One of the most important examples of such commands accepted by the Interpreter is that of "Add New User Interface" in response to which the Interpreter causes a new entry to be made in the application list of FIG. 7 and a new set of UI Data Structures to be allocated and initialized. It should be obvious to one of ordinary skill in the art that having user interface data stored either in files or in data structures, this data can be modified either adding, appending or deleting elements, and that this may also be an action for which a "hard coded" command is provided in the dialog manager.

Similarly it is possible to scale the size and capabilities of the dialog manager by other means. Engines may be added or removed through conventional means such as provision of a plug-in interface in the engine manager components, or adding code to the engine manager to support some alternate set of engines. That set may contain a larger or smaller number of engines, hence scaling the dialog manager. Thus, the dialog manager is scaled by three fundamental methods: adding or removing user interface files, adding or removing service or hardware engines, and adding or removing script files.

The order in which the Interpreter searches for the correct response to a command is shown in FIG. 15. A command may be one of those built in to the Interpreter (15000), e.g., reserved words, in which case the Interpreter executes the built in function selected by the command. In the absence of a built in command, the vocabularies are searched in order from the active application (15002) 3341 to the application launch vocabulary (15004) 3331 to the Dialog Manager vocabulary (15006) 3321. Finally, if the particular environment and implementation supports background tasks, the possible background application vocabularies are searched (15008) and the required application launched as a background task. Here, it is to be understood that all applications discussed up to this point have been, in the common language of computer programmers of ordinary skill, "foreground" tasks and that most modern operating systems also provide the resource of "background" tasks. This distinction in multitasking systems reflects the presentation of the application window in the window order or target of address of user input devices. Data accessed by or created by a background task may be made available to a foreground application or the operating system through such means as shared memory or pipes or other means well know to those of ordinary skill in the art of programming applications under multitasking operating systems. Failing to find the command, the Interpreter can send itself the command to play the command-not-found prompt (15010).

Figure 16:
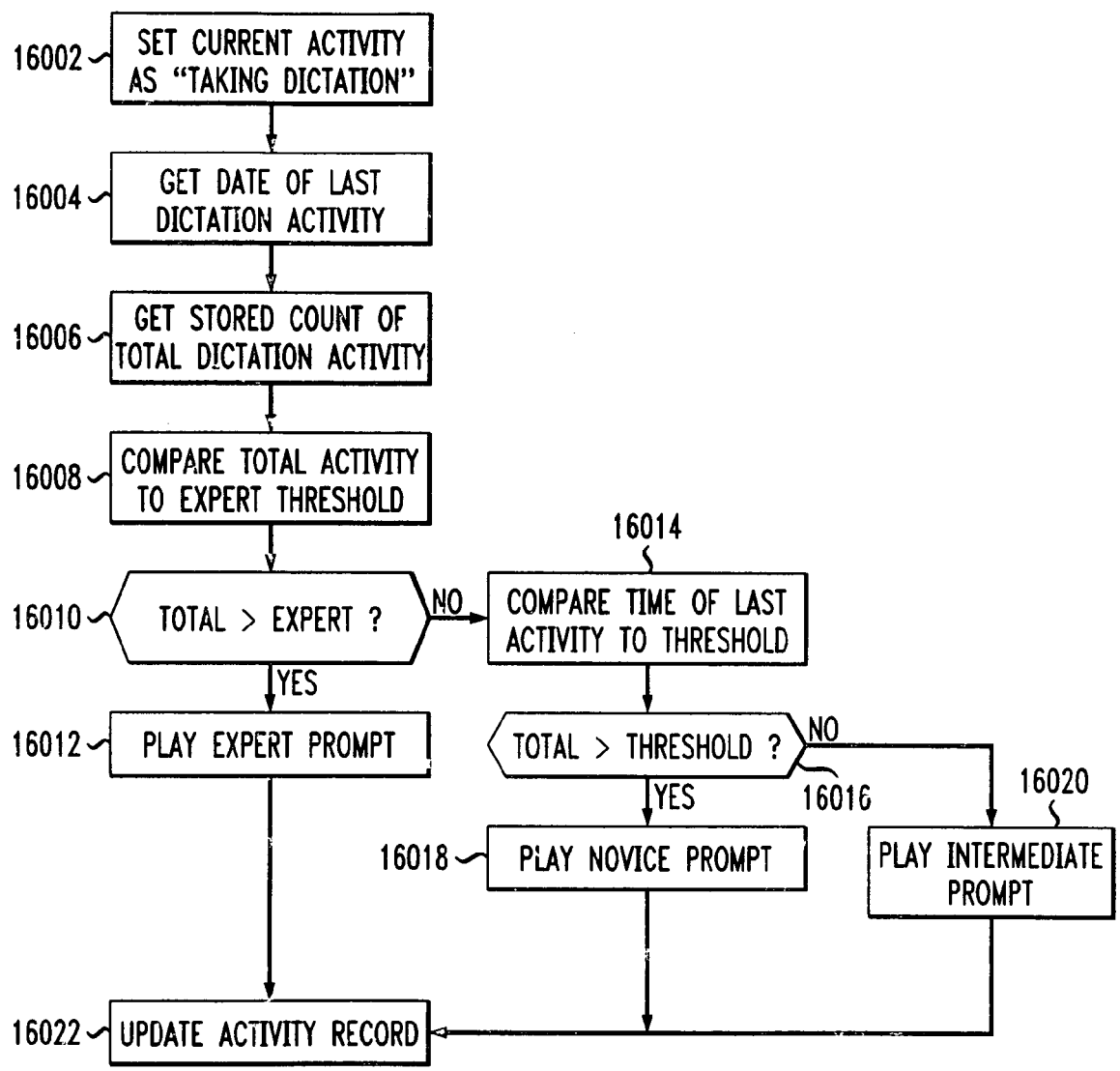
FIG. 16 is a flow diagram illustrating an example of a prompt policy in accordance with one embodiment according to the present invention.

Referring now to FIG. 16, a novel tapering feature using prompts in accordance with the dialog manager of the present invention will now be described. In the normal course of computer operation, a user may need to receive instructions on the best way to proceed. If the user has never encountered some feature of the software or some particular operation, the user may need to receive relatively detailed instructions. Similarly, if a long period has passed since some feature has been used, more detailed instructions may be needed than if the user had operated the feature recently. Obviously, the total experience the user has with a feature also affects the amount of information that must be included in a prompt.

The dialog manager described herein preferably includes a feature which selects among a collection of prompts which are graded in terms of the detail they contain so that, as the user operates the system, they will be given guidance which matches the amount of experience they have with a given feature and the time since they last used that feature.

For the sake of this discussion, let us consider an example which is directly related to the dialog manager features, that is, the use of recording. A user, wishing to record a segment of dictation would be expected to depress the microphone button and say "begin dictation." The microphone button closure, and utterance are handled by the dialog manager by the already described means. Finding the utterance "begin dictation" in a user interface vocabulary file targeted at the dialog manager itself, the associated command and data is returned to the dialog manager. On receiving the new command, the dialog manager may cause a script to execute or it may find the command in its hard coded instructions. Such a script would, by reason of its function, be essentially the same as the hard coded instruction, and is shown in FIG. 16.

As shown in FIG. 16, step 16002, on receiving the command "begin dictation," the dialog manager changes the current activity data to reflect that it is now taking dictation so that all activities which may use the same resources can be halted, as is normal in the course of dialog manager activity.

In step 16004 and step 16006, data items reflecting the user's experience with the dictation function are retrieved from the dialog manager user data. This data is stored in the user interface profile data structure in variables set aside in that structure for the purpose of recording user experience parameters. In this case, the parameters reflect, typical of such parameters, the total number of times the user has operated a feature (up to expert threshold+1) and the date the feature was last used. Other "policy" data may be used and other policy algorithms may be implemented without departing from the spirit this invention.

In step 16008, the value of the variable reflecting the user's total experience (at a rate of one count per use) is compared in step 16010 with the threshold supplied in the profile. If the user's experience exceeds the expert threshold, the expert prompt is selected and played in step 16012. If the user's experience is less than expert, then the time since the last use is calculate in step 16014 and, in accordance with step 16016, either the novice prompt is played (step 16018) or the intermediate prompt is played (step 16020) depending on whether the time since last use exceeds the threshold value provided in the profile.

Prompts at differing levels of expertise may be stored in an extended version of the prompt data structure in which an integer is associated in addition to the standard prompt index. This allows the dialog manager to select among the set of prompts according to a policy such as the one described above.

Once a prompt has been started, the data concerning user experience is updated in step 16022 to reflect the current date and, assuming expert status has not been reached, the fact that one more use has occurred.

Another advanced feature of the dialog manager related to the selection of prompts is the capacity of the dialog manager to select among a collection of prompts meaning the same thing. This, as observed in the user interface work of Nicole Yankolovich (see http://www.acm.org:82/sigchi/chi95/proceedings/papers/ny_bdy.htm and N. Yankelovich, G. Levow and M. Marx, "Designing Speech Acts: Issues in Speech User Interfaces," Conference on Human Factors in Computing Systems CHI'95 (1995)), prevents the system from irritating the user by saying the same thing over and over. While Yankolovich used a prompt taper, that taper was one of increasing information in the prompt in response to the user demonstrating continuing difficulty with a feature. This method is the opposite of the method disclosed here in which long term information about the user experience is maintained to support a pneumonic approach (stimulate the memory of the full instruction) rather than a pedagogical approach (react to the user stumbling by giving more information each time). In a dialog manager providing this kind of service, multiple prompts may be stored with the same index value and expertise value. The dialog manager, searching for the prompt index, finds many possible utterances and, in the absence of an "expertise policy," chooses randomly among them.

Yet another feature of the dialog manager related to the selection of prompts is one which allows playback of recorded speech or other material at those times a prompt is required. This is be accomplished in practice either by searching the set of recorded segments against the prompt index as well as searching the user interface prompt data structure, or preferably, naming the recorded segment in the prompt string entry of the user interface prompt data of the appropriate index. The dialog manager, finding a file name, perhaps preceded by an escape character, will start the playback engine rather than the text to speech engine, through all the conventional actions previously described.

III. Contingent Transfer and Execution of Spoken Language Interfaces

A PSA equipped PDA provides a spoken language user interface through the PSA dialog manager and the human language interface engines it controls. As explained in detail above, the dialog manager depends on files describing the behavior of the user interface, where that behavior includes the words or phrases the interface understands, prompts the user may be given, hardware behavior, and complex activities involving the spoken language services. As time progresses, a user may choose to add new applications to the repertoire of the PDA. This task is supported, in the PalmPilot PDA used in this example, by uploading applications during "HotSync" (trademark of 3Com), the process used to back up and update data bases on the PalmPilot and on the PalmPilot Desktop application.

Figure 17:
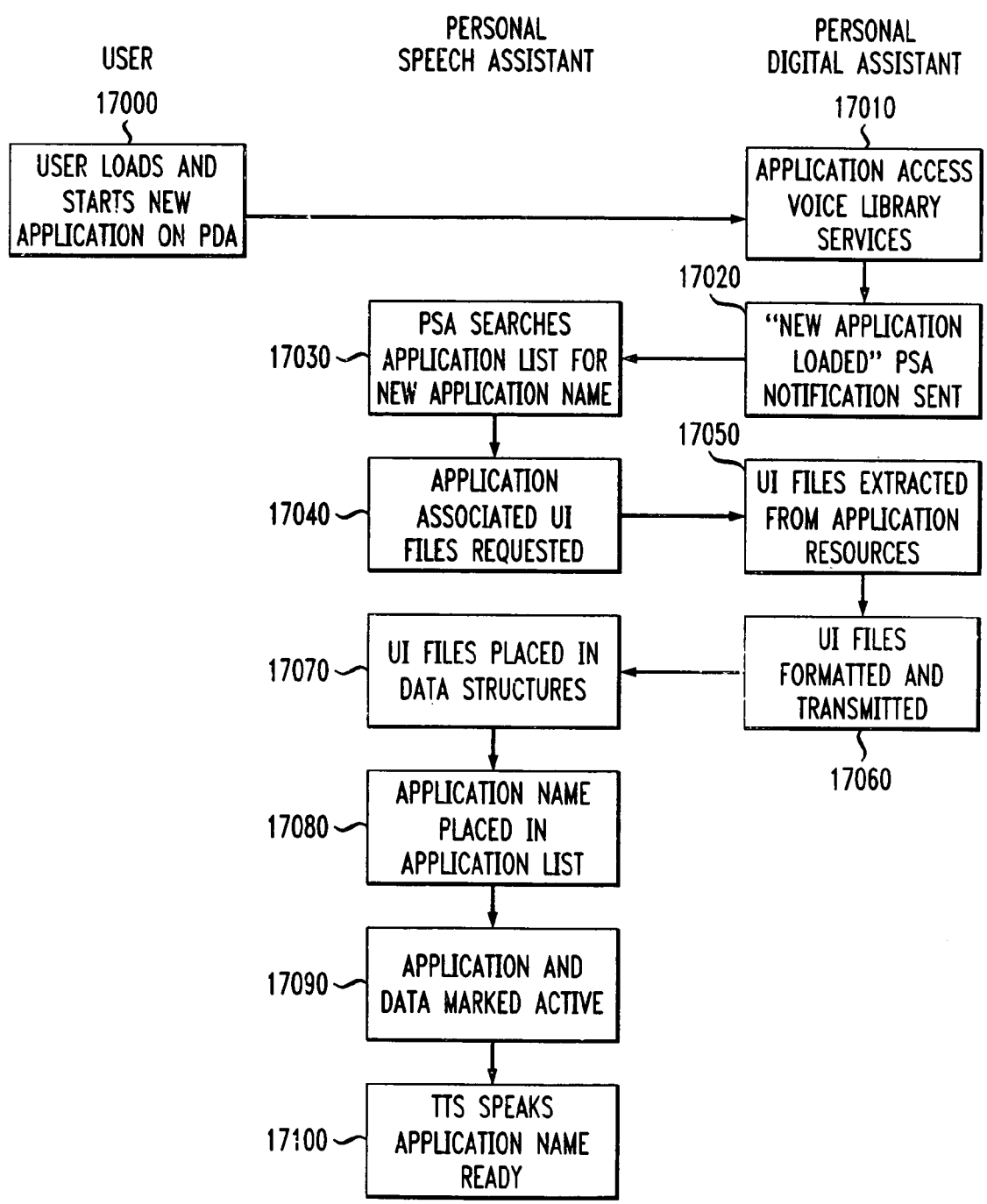
FIG. 17 is a flow diagram illustrating a spoken language interface contingent transfer and execution methodology according to one embodiment of the present invention.

Referring now to FIG. 17, let us assume that a user has added a new speech aware application to the PDA and chooses to access that application (17000). The application may be started by means of the standard application selection panel of the PalmPilot or by more general application navigation means provided by the PSA. As the application begins execution for the first time, it, as a speech aware application, accesses the services of the Voice Library (17010) provided to the PDA at the time it was integrated with the PSA, which recognizes the application as a new application, sends a message (17020) through the serial port attachment to the PDA, as has been previously described. The PDA, receiving the message (17030), finds that it has no user interface data structure entries, i.e., user interface files or tables 3300 (FIG. 3) corresponding to the new application. This search is necessary because the PSA may have been equipped with appropriate user interface files by other means in the form of a firmware update or perhaps at time of manufacture.

The PSA, finding that the user interface files are not in place (17040) sends a request to the PDA for the user interface data. The PalmPilot Voice Library, on receiving the request (17050), extracts the user interface data stored in a "resource" data structure of the new application. Storing data in resources is well known to those of ordinary skill in the art. Upon completion of extracting and formatting the user interface data, the data is sent to the PSA (17060).

On receiving the user interface data (17070), the PSA dialog manager, continuing the "hard-coded" function of adding a new application, places the name of the new application in the application list (17080), sets the user interface files of the new application as the active application files (17090) and, if the active profile (default or application specific) indicates that new applications should be announced, sends a message through the usual dialog manager processes, to the text to speech encoder (3240 of FIG. 3) to announce to the user that he or she may now speak to the application (17100).

In the course of the normal use of a PSA-PDA combination, a user may install so many applications that the total user interface data structure space of the PSA may be taken up. Thus, a PSA of the present invention preferably includes the capability in the user interface data structures for recording the last date of use of a given application's user interface data files. In the event that the user interface data structure is filled to memory capacity, the "last date" data is used by the PSA dialog manager to free space using a "Least Recently Used" algorithm which is well known among those skilled in the art.

Wireless connectivity of PDA devices has become an available and useful technology. It is to be understood that a PSA-PDA may be wirelessly connected to other networks having systems with their own functional processing capabilities. For example, this may be accomplished via the auxiliary communications port 4120 (FIG. 4) which, in various embodiments, may provide for infrared or some other electromagnetic wave communications link between the PSA-PDA and one or more network. A wireless connection version of a PSA-PDA may be expected to require frequent update of its user interface data in order to deal with contingent requirements. This requirement arises from the growing us of "ad hoc" networking as, for example, the Sun Microsystem's "Jini" technology, or the IBM "TSpaces" technology. In each system, a local capability such as printing or data storage is "discovered" as the networking protocol is executed and is smoothly integrated into the system view of attached devices. Advantageously, a PSA-PDA can participate in these dynamic network creation technologies if the devices or locations participating in the network also support the new application user interface protocol described above in the context of adding a new application to the PDA.

Let us take as an example the user entering an airport which contains an airport information system, and a coffee machine, both of which are able to participate in a dynamically configured network and offer support for spoken language interface transfer. The user, on entering the airport, hears the PSA-PDA announce "La Guardia Airport is at your service." Opening the PSA-PDA, the user presses the microphone button and says "Airport" to start the airport application, and "what can I say" to get the current command list. The PSA-PDA, executing the airport application downloaded and installed at the time the network connection was made, recites a list of commands including "what gate." The use presses the microphone button and says "what gate?" The airport application sends the PSA a request to prompt the user, playing "What airline and flight number?" The user replies "United, Flight 42." The airport application packages the request meaning "what gate for United Airlines flight 42" and sends it to the airport information system through the network. The information system returns the value "gate 12." The airport application on the PSA-PDA then packages the complete data set and uses the dialog manager services to say "United flight 42 leaves from gate 12" to the user. Hurrying to gate 12, the user passes a number of vending machines which, with their own network capability, say through the PSA-PDA, "candy," "sandwiches" and "coffee" to the user as he passes. The user stops in front of the coffee machine and says "coffee," "charge," and "Brazilian very light." The coffee machine application downloaded at the time the vending machine network established connection to the PSA-PDA, uses the speaker verification program (in accordance with user verification engine 3220 of FIG. 3) and electronic credit card management programs to bill the coffee to the verified user, and instructs the coffee matching subsystem to vend one very light Brazilian coffee. The user collects the coffee and boards the aircraft connecting to its passenger service network at that time.

It is to be appreciated that in all the examples above, the PSA-PDA combination interacts with an external network, e.g., an ad hoc network, which includes its own processor and other associated hardware and software, e.g., the airport information system, coffee vending machine, passenger service network, etc. Thus, the present invention provides methodology for a PSA-PDA to interact with external networks and systems with which it comes into wireless contact and to create or update respective user interface data sets (i.e., user interface files or tables 3300 of FIG. 3) such that the PSA-PDA may serve as a spoken language interface for a user with each of the various networks and systems. A block diagram of this relationship is shown in FIG. 18A. As shown, a PSA-PDA 18200 is in wireless communications with an external network 18300 such that a user is provided with a spoken language interface for interaction with the external network.

It should be obvious to one of ordinary skill in the art that, at the highest level, for a single type of transaction, dynamically creating a new application and it's spoken language interface is at the core of each of the user transactions. The structure of the specific applications is outside the scope of this invention.

Referring now to FIG. 18B, an example of a contingent transfer and execution protocol for use in accordance an ad hoc network, such as a personal area network, is shown. The user, in the normal course of events, enters an area which has appropriate dynamic networking (e.g., an ad hoc network) and spoken language user interface support (18000). The dynamic networking "discovery" capability, which may be part of the PSA or of the PDA, finds the network, establishes connection, and informs the PDA of the new application (18010). The PDA, finding that it has no listing of the application (18020), has a request (18030) forwarded to the network for all files associated with that application. It should be understood that if some components, such as the PDA application or the user interface files are already present, the request could easily be limited to the missing components.

Continuing, the request is received by the network which formats the information and returns it to the PSA-PDA (18040) where the PSA, for example, distributes the application part to the PDA (18050) which installs the application by conventional means (18060) and to the user interface data structure (18070) and the application name list (18080).

Having completed installation, the process continues by marking the new application user interface files as active (18090) and announcing the availability of the application(s) offered by the ad hoc network (18100), e.g., in the case of the vending machine, candy, sandwiches and coffee.

In normal operation, many such networks and services may be encountered by a user. It should be obvious to one of ordinary skill in the art that the dialog manager could be constructed so that the user may, by means of profile data or spoken request, cause such available service announcements to be eliminated, or made only by command such as "what can I speak to?"

Accordingly, it has been explained that the present invention provides a methodology for managing spoken language interface data structures in a spoken language dialog manager in a PSA. Interfaces, designed as part of applications, may by this methodology be added to or removed from the set of such interfaces used by a dialog manager. It is to be appreciated that interface service engines, required by new applications but not already present in the dialog manager, may also be transferred and executed in accordance with the above methodologies such that they are available to the new and subsequently added applications.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. In apparatus for providing a portable spoken language interface for a user to a device in communication with the apparatus, the device having at least one application associated therewith, the spoken language interface apparatus comprising: (A) an audio input system for receiving speech data provided by the user; (B) an audio output system for outputting speech data to the user; (C) a speech recognition engine for generating an output in response to spoken utterances; (D) a speech synthesizing engine for generating a synthesized speech output in response to text data; (E) a dialog manager operatively coupled to the device, the audio input system, the audio output system, the speech recognition engine and the speech synthesizing engine; and (F) at least one user interface data set operatively coupled to the dialog manager, the user interface data set representing spoken language interface elements and data recognizable by the application of the device; wherein: (i) the dialog manager enables connection between the input audio system and the speech recognition engine such that the spoken utterance provided by the user is provided from the input audio system to the speech recognition engine; (ii) the output generated by the speech recognition engine is returned to the dialog manager; (iii) the dialog manager uses the output generated by the speech recognition engine to search the user interface data set for a corresponding spoken language interface element and data which is returned to the dialog manager when found;

(iv) the dialog manager provides the spoken language interface element associated data to the application of the device for processing in accordance therewith; (v) the application of the device, on processing that element, provides a reference to an interface element to be spoken; (vi) the dialog manager enables connection between the audio output system and the speech synthesizing engine such that the speech synthesizing engine which, accepting data from that element, generates a synthesized output that expresses that element; and (vii) the audio output system audibly presenting the synthesized output to the user; a method for modifying a data structure containing the at least one user interface data set, comprising:

adding a new application to the device;

generating a second user interface data set in accordance with the new application, the second user interface data set representing spoken language interface elements and data recognizable by the new application;

transferring the second user interface data set from the device to the apparatus; and loading the second user interface data set into the data structure of the apparatus.

2. The method of claim 1, further comprising the step of audibly notifying the user that the new application is useable via the audio output system.

3. The method of claim 1, further comprising the step of removing a user interface data set from the data structure.

4. The method of claim 3, wherein the user interface data set is removed prior to the loading step in accordance with a least recently used algorithm.

5. The method of claim 3, wherein the user interface data set is removed in accordance with a request by an application.

6. The method of claim 1, wherein the new application comprises a speech aware application, the speech aware application being responsive to user utterances for at least partially interacting with the new application.

7. The method of claim 1, further comprising the step of:

the device prompting the user for information comprising a spoken utterance, the device manager being responsive to the spoken utterance for operatively modifying at least one of a predetermined parameter of the device and an application running on the device.

8. The method of claim 7, wherein the step of prompting the user for information includes the steps of:

storing one or more user experience parameters corresponding to a familiarity of the user with a predetermined procedure of the application; and selecting a prompt from a set of prompts for presentation to the user, the set of prompts including varying amounts of instruction based at least in part on experience parameters, the selected prompt substantially matching the stored experience parameters of the user.

9. The method of claim 7, wherein the step of prompting the user for information includes the steps of:

storing an internal data set including at least one of a date, a time and a number of times which a predetermined procedure of an application is performed; and selecting a prompt from a set of prompts for presentation to the user, the set of prompts including varying amounts of instruction based at least in part on information included in the internal data set, the selected prompt substantially matching the stored internal data set.

* * * * *